US008073761B2

(12) United States Patent
Bjornson et al.

(10) Patent No.: US 8,073,761 B2
(45) Date of Patent: Dec. 6, 2011

(54) TRADING AND INVESTMENT CALCULATOR

(76) Inventors: John Eric Bjornson, Shawnigan Lake (CA); Kristin Heather Bjornson, Shawnigan Lake (CA)

( * ) Notice: Subject to any disclaimer, the term of this patent is extended or adjusted under 35 U.S.C. 154(b) by 1070 days.

(21) Appl. No.: 10/640,827

(22) Filed: Aug. 12, 2003

(65) Prior Publication Data
US 2004/0103127 A1   May 27, 2004

Related U.S. Application Data

(60) Provisional application No. 60/402,559, filed on Aug. 12, 2002.

(51) Int. Cl.
*G06Q 40/00* (2006.01)
(52) U.S. Cl. ............................................ 705/37; 705/35
(58) Field of Classification Search ............... 705/35–45
See application file for complete search history.

(56) References Cited

U.S. PATENT DOCUMENTS

| | | | |
|---|---|---|---|
| 3,272,431 A * | 9/1966 | Dablo ............................ 235/69 |
| 4,081,859 A | 3/1978 | Goldsamt et al. | |
| 4,545,022 A | 10/1985 | Hughins | |
| 4,744,044 A | 5/1988 | Stover et al. | |
| 4,800,514 A | 1/1989 | Earle | |
| 5,025,403 A | 6/1991 | Stephens | |
| 5,038,284 A * | 8/1991 | Kramer ............................. 705/37 |
| 5,089,980 A | 2/1992 | Bunsen et al. | |
| 5,260,886 A | 11/1993 | Bunsen | |
| 5,915,245 A * | 6/1999 | Patterson et al. .................. 705/35 |
| 6,625,583 B1 * | 9/2003 | Silverman et al. ......... 705/36 R |
| 6,825,832 B2 * | 11/2004 | Chung et al. ..................... 345/168 |
| 6,850,907 B2 * | 2/2005 | Lutnick et al. ...................... 705/37 |
| 7,251,629 B1 * | 7/2007 | Marynowski et al. ........... 705/37 |
| 2002/0120555 A1 * | 8/2002 | Lerner .............................. 705/37 |
| 2003/0004862 A1 * | 1/2003 | Lutnick et al. ................... 705/37 |
| 2003/0233309 A1 * | 12/2003 | Matus et al. ...................... 705/37 |

FOREIGN PATENT DOCUMENTS

| WO | WO 00/75836 | * 12/2000 |
|---|---|---|
| WO | WO 01/46841 | * 6/2001 |

OTHER PUBLICATIONS

The Monroe Trader. Instruction Manual. Litton Business Systems, Inc., 1978.

* cited by examiner

*Primary Examiner* — Sarah Monfeldt

(57) ABSTRACT

The specification discloses a handheld computing device or portable electronic calculator that comprises a software application adapted to provide instructions to perform math operations to calculate trading and investment variables and display these variables resulting from the math operation(s) on the display screen simultaneously along with descriptive acronyms. The software application may be further adapted to provide instructions that allows a user to input trading and investment variables including trading price/or trading premium and then incrementing trading price/or premium by decimal or fraction with up and down arrow key(s) or "speed key(s)" on the input device concurrently while viewing the trading price/or premium and calculated order size/or number of contract(s) changes on the display screen. The handheld computing device or portable electronic calculator determines variables that are used during active trading and investment (e.g.'s calculate gain/loss (dollars & percent), gross/net profit (dollars & percent), return rate, yield, cash flow, income, costs/fees, dividends, dividend reinvested income, reinvestment percent, average quarterly dividends, taxes, before/after taxes, before/after costs and fees, share volume, term, margin, short & long-term capital gains/losses, cost per share, basis per share, adjusted basis, total basis, buy & sell price, cash amounts, breakeven price, total cost, order sizes by price, number of contracts by premium, leverage ratios, liquidity ratio, operations ratios, profitability ratios.)

1 Claim, 9 Drawing Sheets

TRADING AND INVESTMENT CALCULATOR

CROSS-REFERENCE TO RELATED APPLICATIONS

This application claims priority from U.S. provisional application No. 60/402,559 filed Aug. 12, 2002; which is incorporated herein in the entirety by reference.

BACKGROUND OF THE INVENTION

Some existing calculators have the ability to perform mathematical operations on bonds, notes, and treasury bills, and then display this information. However, such calculators do not perform math operations to calculate stock, futures, options, mutual funds, indexes, exchange traded funds, currency, commodities, or interest rate trading and investment variables, in addition to more common investment calculations such as gain/loss (dollars & percent), gross/net profit (dollars & percent), return rate, yield, cash flow, income, costs/fees, dividends, dividend reinvested income, reinvestment percent, average quarterly dividends, taxes, before/after taxes, before/after costs and fees, share volume, term, margin, short & long-term capital gains/losses, cost per share, basis per share, adjusted basis, total basis, buy & sell price, cash amounts, breakeven price, total cost, order sizes by price, number of contracts by premium, leverage ratios, liquidity ratios, operations ratios, profitability ratios, and display these variables resulting from the math operation(s) on the display screen simultaneously along with descriptive acronyms. Also, such calculators are not "portable handheld" consumer calculators, but rather are very "heavy duty" expensive desktop calculators for professional traders, limited to bond, notes, and treasury bill calculations. The present invention generally relates to handheld computing devices, and more specifically to an apparatus and method to perform math operations to calculate trading and investment variables, and display these variables resulting from the math operation(s) on the display screen simultaneously along with descriptive acronyms. This handheld computing device or portable electronic calculator is "for traders and investors of all levels . . . trading securities of all types"

Methods have been developed for electronic calculators to perform calculations for bonds, notes, and treasury bills only. "The Monroe Trader" (1978; serial # K554351 made in the U.S.) calculates data only for bonds, notes, and treasury bills, and was designed only as a "heavy duty" desktop calculator for use by professionals. In researching prior art, there has not been a "portable handheld" consumer calculator or handheld computing device invented for trading and investment; only very large, heavy duty desktop calculators for professionals who trade bonds, notes, and treasury bills. This patent for Trading & Investment Calculator performs math operations to calculate stock, futures, options, mutual funds, indexes, exchange traded funds, currency, commodities, or interest rate trading and investment variables, in addition to more common investment calculations such as gain/loss (dollars & percent), gross/net profit (dollars & percent), return rate, yield, cash flow, income, costs/fees, dividends, dividend reinvested income, reinvestment percent, average quarterly dividends, taxes, before/after taxes, before/after costs and fees, share volume, term, margin, short & long-term capital gains/losses, cost per share, basis per share, adjusted basis, total basis, buy & sell price, cash amounts, breakeven price, total cost, order sizes by price, number of contracts by premium, leverage ratios, liquidity ratios, operations ratios, profitability ratios, and display these variables resulting from the math operation(s) on the display screen simultaneously along with descriptive acronyms. Other types of electronic calculators have been developed that allow direct input of fractional data (pre-defined and manual input of fractions). Please see "References" in this document. Patents that relate to "pre-defined fractional input" have now expired (see Goldsamt, et al. and Hughins); patents that relate to "manual fraction input" are very close to their expiration date (see Stover, et al.):

| 4,081,859 | Mar., 1978 | Goldsamt, et al. | 364/709 |
| 4,545,022 | Oct., 1985 | Hughins | 364/709 |
| 4,744,044 | May, 1988 | Stover, et al. | 364/737 |

This patent for Trading and Investment Calculator takes advantage of "pre-defined fractional input", in order to calculate trade order size(s) by price and number of option(s)/or contract(s) by premium, allowing the user to quickly scroll through a range of records in either decimal or fractional formats. We have not found any prior art for portable handheld calculators or handheld computing devices that allows the user to quickly scroll through order size(s) by price, or scroll through number of option(s)/or contract(s) by premium in either a decimal or fractional format. In addition, we have not found any prior patents for portable handheld calculators or handheld computing devices that perform math operations to calculate stock, futures, options, mutual funds, indexes, exchange traded funds, currency, commodities, or interest rate trading and investment variables, in addition to more common investment calculations such as gain/loss (dollars & percent), gross/net profit (dollars & percent), return rate, yield, cash flow, income, costs/fees, dividends, dividend reinvested income, reinvestment percent, average quarterly dividends, taxes, before/after taxes, before/after costs and fees, share volume, term, margin, short & long-term capital gains/losses, cost per share, basis per share, adjusted basis, total basis, buy & sell price, cash amounts, breakeven price, total cost, order sizes by price, number of contracts by premium, leverage ratios, liquidity ratios, operations ratios, profitability ratios, and display these variables resulting from the math operation(s) on the display screen simultaneously along with descriptive acronyms.

Because the preferred embodiment of the present invention calculates and displays trading and investment data, it provides an advantage of being a useful trading and investment tool. In addition, because the present invention is "portable" or "handheld" (unlike previous heavy duty desktop calculators), traders and investors can easily take it with them wherever they go. In addition, this calculator was designed for traders and investors of all levels . . . and not designed solely for professionals. The preferred embodiment may be valuable as a self-teaching aid allowing a trader/or investor to enter many examples and "what if" scenarios and see the results immediately on the screen.

BRIEF SUMMARY OF THE INVENTION

The problems and needs outlined above are addressed by the present invention. Essentially, a portable handheld calculator or handheld computing device is provided enabling traders and investors worldwide to be fast, proactive, prepared, and informed by quickly performing trading and investment functions. Some of these functions include: gain/loss (dollars & percent), gross/net profit (dollars & percent), return rate, yield, cash flow, income, costs/fees, dividends, dividend reinvested income, reinvestment percent, average quarterly dividends, taxes, before/after taxes, before/after costs and fees, share volume, term, margin, short & long-term capital gains/losses, cost per share, basis per share, adjusted basis, total basis, buy & sell price, cash amounts, breakeven price, total cost, order sizes by price, number of contracts by premium, leverage ratios, liquidity ratios, operations ratios, profitability ratios.

In accordance with one aspect of the present invention, a handheld computing device is provided, which comprises: an electrical circuit, a display screen, an input device, and a software application. The electrical circuit comprises a memory device electrically coupled to a processor. The display screen and the input device are each electrically coupled to the electrical circuit. The software application is stored in the memory device, and when executed by the processor, the software application is adapted to provide instructions to display trading and investment data on the display screen simultaneously along with descriptive acronyms. The handheld computing device may be a calculator with a display screen comprising a liquid crystal display device and an input device comprising a keypad, for example. The handheld computing device may be an electronic personal organizer. Such an electronic personal organizer may have a display screen comprising a touch sensitive screen, and the input device may comprise a simulated keypad displayed on the touch sensitive screen, such that a user can input a number or mathematical operator by contacting the touch sensitive screen, for example. The handheld computing device may be a cellular telephone and/or a pager, for example. The software application may be further adapted to provide instructions to perform math operations in order to calculate trading and investment variables. The software application may be further adapted to provide instructions to allow a user to input trading and investment variables including trading price/or trading premium and then incrementing trading price/or premium by decimal or fraction with dedicated or non-dedicated keys such as up and down arrow key(s) or "speed key(s)" on the input device concurrently while viewing the price/or premium and price/or premium changes on the display screen. The memory device may comprise a flash memory device or a synchronous dynamic access memory (SDRAM) device, for example. The input device may comprise at least one soft key shown on the display screen corresponding to a button on the keypad.

In accordance with another aspect of the present invention, a handheld computing device is provided, which comprises a software application stored in a memory device, and when executed by a processor, the software application being adapted to provide instructions to: perform math operations to calculate trading and investment variables; and display trading and investment variables resulting from the math operation on the display screen simultaneously along with descriptive acronyms.

In accordance with yet another aspect of the present invention, the software application being adapted to provide instructions to: allow a user to input trading and investment variables including price and premium and then increment it by decimal or fractions with up and down arrow keys or speed keys on the input device, concurrently while viewing the trading price/or premium and calculated order size/or contract changes on the display screen; and calculate trade price(s)/or premium(s) between a maximum and minimum trading price/or premium with a resultant trading price/or premium range and means for calculating order size(s)/or number of contract(s) for each trading price(s)/or premium(s) within the price/or premium range; and where the keyboard includes incremental "speed key(s)" and "up/down arrow scroll key(s)" operatively connected to the processing means for automatically initiating the operations of the processing means involving numeric values in the internal price/or premium set by the price/or premium previously entered through the keyboard, where the user can quickly change the previously entered price/or premium with positive and negative incremental price/or premium "speed key(s)" and "up/down arrow scroll key(s)" to arrive at a new price/or premium and obtain a new order size/or number of contracts generating a display signal upon entry of the price(s)/or premium(s) or depression of the "up/down arrow scroll key(s)" or "speed key(s)"; and determine trade order size(s) by price; and determine number of contract(s) by premium; and perform math operations to calculate options variables to solve option(s) trading tasks; and perform math operations to calculate investment variables to solve investment tasks such as: such as gain/loss (dollars & percent), gross/net profit (dollars & percent), return rate, yield, cash flow, income, costs/fees, dividends, dividend reinvested income, reinvestment percent, average quarterly dividends, taxes, before/after taxes, before/after costs and fees, share volume, term, margin, short & long-term capital gains/losses, cost per share, basis per share, adjusted basis, total basis, buy & sell price, cash amounts, breakeven price, total cost, order sizes by price, number of contracts by premium, leverage ratios, liquidity ratios, operations ratios, profitability ratios.

In accordance with yet another aspect of the present invention, a computer program adapted to be executed on a handheld computing device is provided. When executed on the handheld computing device, the computer program is adapted to provide instructions to display trading and investment data on a display screen of the handheld computing device simultaneously along with descriptive acronyms. The computer program may be further adapted to provide instructions to perform math operations in order to calculate trading and investment variables. The computer program may be further adapted to provide instructions to_allow a user to input trading and investment data including price and premium and then increment it by decimal or fractions with up and down arrow keys or speed keys on the input device, concurrently while viewing the trading price/or premium and calculated order size/or contract changes on the display screen. The computer program may be further adapted to provide instructions to calculate trade price(s)/or premium(s) between a maximum and minimum trading price/or premium with a resultant trading price/or premium range and means for calculating order size(s)/or number of contract(s) for each trading price(s)/or premium(s) within the price/or premium range. The computer program may be further adapted to provide instructions to/from a keyboard that includes incremental "speed key(s)" and "up/down arrow scroll key(s)" operatively connected to the processing means for automatically initiating the operations of the processing means involving numeric values in the internal price/or premium set by the price/or premium previously entered through the keyboard, where the user can quickly change the previously entered price/or premium with positive and negative incremental price/or premium "speed key(s)" and "up/down arrow scroll key(s)" to arrive at a new price/or premium and obtain a new order size/or number of contracts generating a display signal upon entry of the price(s)/or premium(s) or depression of the "up/down arrow scroll key(s)" or "speed key(s)". The computer program may be further adapted to provide instructions to determine trade order size(s) by price and to determine the number of contracts by premium. The computer program may be further adapted to provide instructions to perform math operations to calculate options variables to solve option(s)

trading tasks and to perform math operations to calculate investment variables/or equations to solve investment tasks such as gain/loss (dollars & percent), gross/net profit (dollars & percent), return rate, yield, cash flow, income, costs/fees, dividends, dividend reinvested income, reinvestment percent, average quarterly dividends, taxes, before/after taxes, before/after costs and fees, share volume, term, margin, short & long-term capital gains/losses, cost per share, basis per share, adjusted basis, total basis, buy & sell price, cash amounts, breakeven price, total cost, order sizes by price, number of contracts by premium, leverage ratios, liquidity ratios, operations ratios, profitability ratios.

In accordance with yet another aspect of the present invention, the software application being adapted to provide instructions to perform math operations in order to calculate stock, futures, options, mutual funds, indexes, exchange traded funds, currency, commodities, or interest rate trading and investment variables, in addition to more common investment calculations such as gain/loss (dollars & percent), gross/net profit (dollars & percent), return rate, yield, cash flow, income, costs/fees, dividends, dividend reinvested income, reinvestment percent, average quarterly dividends, taxes, before/after taxes, before/after costs and fees, share volume, term, margin, short & long-term capital gains/losses, cost per share, basis per share, adjusted basis, total basis, buy & sell price, cash amounts, breakeven price, total cost, order sizes by price, number of contracts by premium, leverage ratios, liquidity ratios, operations ratios, profitability ratios, and display these variables resulting from the math operation(s) on the display screen simultaneously along with descriptive acronyms.

More particularly, in the first aspect, the calculator includes means for storing numeric trading price(s)/or premium(s) and range(s), and the cash, margin, option, and total buying power dollar amounts. This numeric input is used as a means for calculating trade order size(s) and number of option(s)/or contract(s) by price/or premium. The trader selects a predefined fraction from a selector switch or button, in addition to a mode type of decimal or fraction. The trader then simply inputs the cash, margin, option money, buying power, and price/or premium into the calculator and it responds by assigning each price/or premium an order size/or number of option(s)/or contract(s) determined by internal calculations. The user/or trader, can then quickly scroll/view order size(s) and number of option(s)/or contract(s) by price or premium using speed keys and up/down arrow keys throughout a price/or premium range. Speed keys or up/down arrow keys can be used to quickly change price increments, instead of re-keying trading data over and over again.

In a preferred embodiment of the first aspect, the calculator includes means enabling the trader to manually override/or clear the numeric trading price/or premium. This enables the calculator to accommodate different trading price/or premium ranges without changing preset keys for total cash, margin, option money, or buying power dollar amounts.

In a second aspect, the calculator automatically determines unknown/or not stored variables for an option(s) trade and for a variety of margin, cash flow, and rate-of-return calculations. For these types of trading functions, the trader inputs option, margin, cash flow, and rate-of-return variables, and the calculator responds by returning the unknown/or not stored variable. The calculator determines and displays the variable corresponding to the trading mode/function performed. The Trading Calculator also performs standard calculator functions.

These and other objects, advantages, and features of the invention will be more fully understood and appreciated by reference to the detailed description of the preferred embodiment and the drawings.

BRIEF DESCRIPTION OF THE SEVERAL VIEWS OF THE DRAWING

Note: The Trading and Investment Calculator will be manufactured in several different styles or models (pocket, hand-held, desktop). Three different drawings/or models are being included in this patent, as the Claim(s) apply to each, and have been written accordingly:

1. Advanced/or Pro Model (hand-held or desktop styles only). This model incorporates Standard Calculator Mode, Trade Order Size Mode, Option Mode, and Investment Mode (which includes calculations such as: gain/loss (dollars & percent), gross/net profit (dollars & percent), return rate, yield, cash flow, income, costs/fees, dividends, dividend reinvested income, reinvestment percent, average quarterly dividends, taxes, before/after taxes, before/after costs and fees, share volume, term, margin, short & long-term capital gains/losses, cost per share, basis per share, adjusted basis, total basis, buy & sell price, cash amounts, breakeven price, total cost, order sizes by price, number of contracts by premium, leverage ratios, liquidity ratios, operations ratios, profitability ratios, for example.)

Figure 1A:
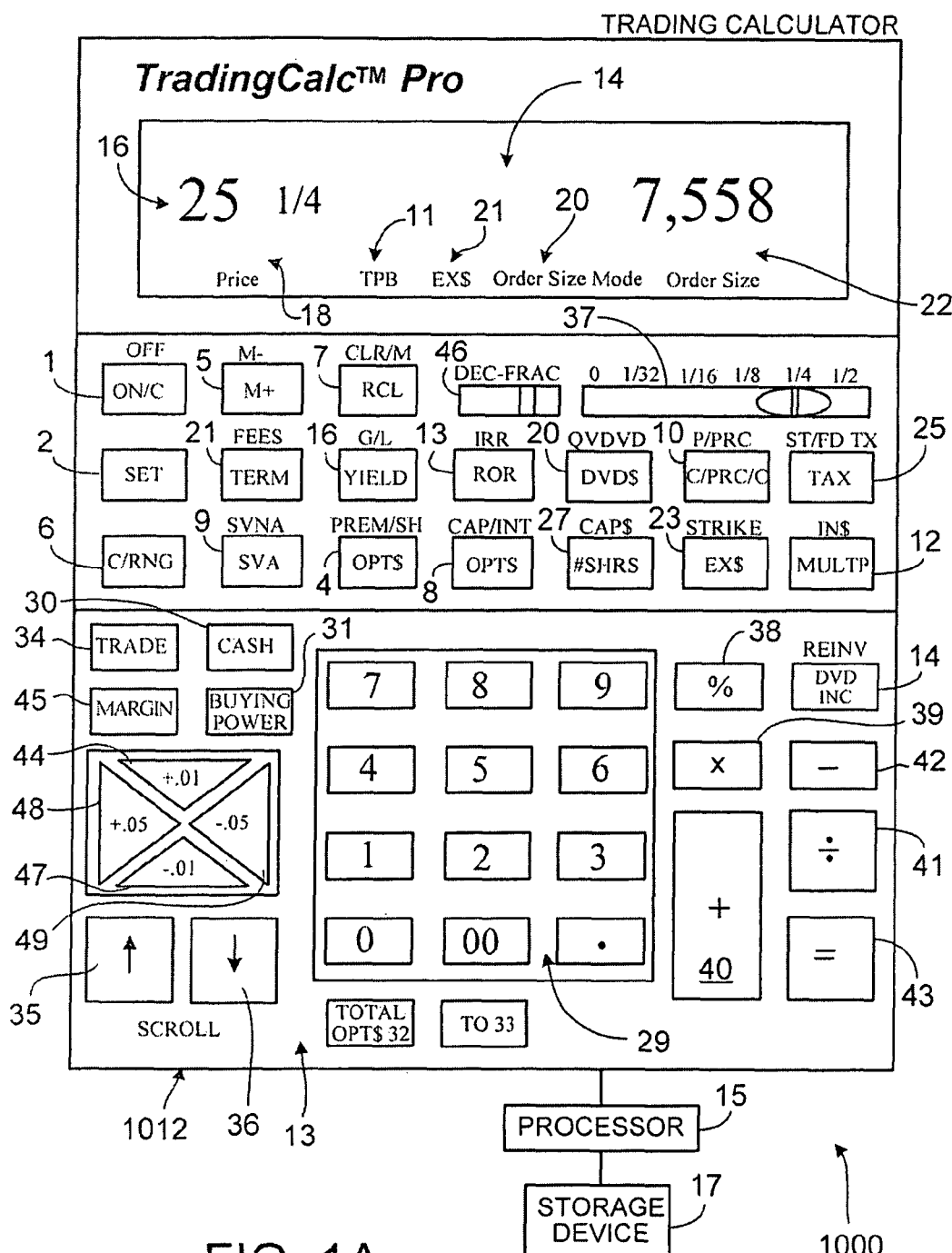

2. Basic/or "Core Concept" Model (pocket, hand-held, or desktop styles). Includes Standard Calculator Mode, Trade Order Size Mode (that includes premium and contracts), and Investment Mode (that only includes very simple investment calculations, as shown in Item #1 above.)

3. Investment Model (pocket, hand-held, or desktop styles). Includes Standard Calculator Mode, Trade Order Size Mode (that includes premium and contracts), and Investment Mode (that includes all of the advanced investment calculations such as: gain/loss (dollars & percent), gross/net profit (dollars & percent), return rate, yield, cash flow, income, costs/fees, dividends, dividend reinvested income, reinvestment percent, average quarterly dividends, taxes, before/after taxes, before/after costs and fees, share volume, term, margin, short & long-term capital gains/losses, cost per share, basis per share, adjusted basis, total basis, buy & sell price, cash amounts, breakeven price, total cost, order sizes by price, number of contracts by premium, leverage ratios, liquidity ratios, operations ratios, profitability ratios.

The "Investment Model" also calculates "Business Investment Ratios" or "Business Performance Ratios" in addition to calculating more common variables for investment tasks as shown above in Item #1. Investors can use these ratios when analyzing whether or not to invest in a business. These investment/or performance ratios are a way to evaluate the performance of a business and identify problems. This model helps investors, or others in business, calculate important ratios. Each ratio calculates variables such as solvency, earning power, debt load, and efficiency of a business. These key ratios are used to measure the relationship between (2) two or more variables of financial statements. Users will enter all known variables, and then solve for the unknown investment ratio. Investment/or performance ratios on the "Investment Model" include:

Leverage ratios: how assets are financed
    Debt-to-asset ratio
        Calculation=liabilities/assets Variables=current assets, fixed assets, total liabilities
Commonly known as the Debt Asset Ratio, it determines the extent to which acquisition of assets have been financed by creditors.

Debt-to-equity ratio

Calculation=total liabilities/shareholders' equity

Variables=total liabilities, shareholders equity.
This ratio determines the amount of liabilities the business has for every dollar of shareholders' equity.

Liquidity Ratios: Ability of the Business to Meet Obligations

Quick ratio

Calculation=quick assets/current liabilities

Variables=temporary investments & marketable securities, cash, other current assets, current liabilities.
Sometimes this is called the Cash Ratio or the Acid Test Ratio, because it indicates the company's ability to pay off creditor demands using liquid and current assets.

Inventory to net working capital

Calculation=inventory/(current assets−current liabilities)

Variables=inventory, current assets (including inventory), current liabilities
Determines if current working capital proportion in inventory is too high.

Current ratio

Calculation=current assets/current liabilities

Variables=current assets, current liabilities
Sometimes called the Working Capital Ratio, this ratio determines the extent to which current assets are available to meet current liabilities, due within the next 12 months.

Operations Ratios: Effectiveness of Internal Operations

Accounts receivable turnover

Calculation=net credit sales/average accounts receivables.

Variables=average accounts receivable, net sales.
Determines liquid accounts receivable for the year. The average accounts receivable is an average of the opening and closing balances for accounts receivable.

Asset utilization

Calculation=net sales/total assets

Variables=current assets, fixed assets, net sales.
Determines the number of dollars in sales earned for each dollar invested in assets.

Fixed asset utilization

Calculation=net sales/average net fixed assets

Variables=average of net fixed assets, sales.
Sometimes called the Sales to Fixed Assets Ratio, it determines the number of dollars in sales earned for each dollar of investment in fixed assets. This ratio is sometimes used in combination with the Asset Utilization Ratio. The Average of Net Fixed Assets equals the average of the opening and closing balances of fixed assets.

Sales per employee

Calculation=sales for the year/average number of employees

Variables=annual sales, average number of employees.
Determines the level of sales per employee.

Average collection period

Calculation=(days in period*average accounts receivable)/net credit sales

Variables=opening balance for accounts receivable, closing balance for accounts receivable, number of days in period, net sales.
Determines the average number of days customers use to pay bills. This ratio determines if credit terms are acceptable. The days in the period is typically 365 days. Average accounts receivable is the average of the opening and closing balances of Accounts Receivable for the period.

Average days payable

Calculation=(days in period*average accounts payable)/purchases on credit

Variables=opening balance for accounts payable, closing balance for accounts payable, number of days in period, credit purchases.
Determines the average number of days to pay suppliers. The days in the period is typically 365 days. Average accounts payable is the average of the opening and closing balances of accounts payable for the period.

Days of sale in inventory

Calculation=days in the period*average inventory/cost of goods sold

Variables=opening balance for inventory, closing balance for inventory, number of days in period, cost of goods sold.
Sometimes called Days of Inventory Sales, this ratio determines the number of days of sales with current inventory. This ratio is used to determine whether or not there is too much investment in inventory. The days in period is typically 365 days. Average inventory is the average of the opening and closing balances of inventory for the period.

Inventory turnover

Calculation=cost of goods sold/average inventory

Variables=cost of goods sold, average inventory during year.
Determines the number of times of inventory turnover during the year (replaced and sold). This is a key ratio because gross profit is earned each time there is inventory turnover.

Profitability Ratios: Profit Generated

Earnings per share

Calculation=(net income−preferred dividends)/number of common shares

Variables=net income, preferred dividends, number of outstanding common shares.
Determines earnings generated for each share of common stock (before or after taxes).

Return on total assets

Calculation=income from operations/average total assets

Variables=income from operations, average current assets, average fixed assets.
Determines the effectiveness of asset use to earn income by the amount of profit earned for every $100 invested in assets. Income from operations excludes expenses such as financing charges and income taxes. Average total assets equals average fixed assets plus average current assets.

Net profit margin

Calculation=net profit after taxes/net sales

Variables=net income (before or after taxes), net sales.
Sometimes called the Return on Sales Ratio, this ratio shows the profit (before or after tax; net income) produced by each dollar in sales by determining the percentage of sales revenue kept after creditor interest expenses, operating expenses, and income taxes.

Return of shareholder's equity

Calculation=(net income for the year−interest−taxes)/
    shareholders' equity

Variables=shareholder's equity, net earnings, taxes (before or after), interest.
Determines return rate shareholders receive on their investment. Net income for the year is after taxes and interest due to the fact that shareholders can only have the balance.

Coverage ratio

Calculation=profit before taxes and interest/annual
    bank and interest charges Variables=profit (before interest and taxes), annual interest and bank charges.
Sometimes known as the Number of Times Interest Earned Ratio, this ratio determines the organizations ability to produce enough income to pay loan interest charges.

All of the flowcharts below are pseudo code flowcharts illustrating the process logic and instructions provided by the software application for the preferred embodiment. The particular computer language used to implement the logic and instructions shown in these figures may vary, depending on the programmer's preference and/or depending on the computing device of an embodiment. The main process and sub-routines for various modes and functions called upon by the main process are described and illustrated.

The figures and drawings are not necessarily drawn to scale, and in some instances the drawings have been exaggerated and/or simplified in places for illustrative purposes only. One of ordinary skill in the art will appreciate the many possible applications and variations of the present invention based on the following examples of possible embodiments of the present invention. Features of the present invention may be incorporated into a new device and/or may be provided as a software application enabling an existing device to provide such features, for example.

TRADING CALCULATOR—ADVANCED MODEL (hand-held, or desktop styles)

Figure 1B:
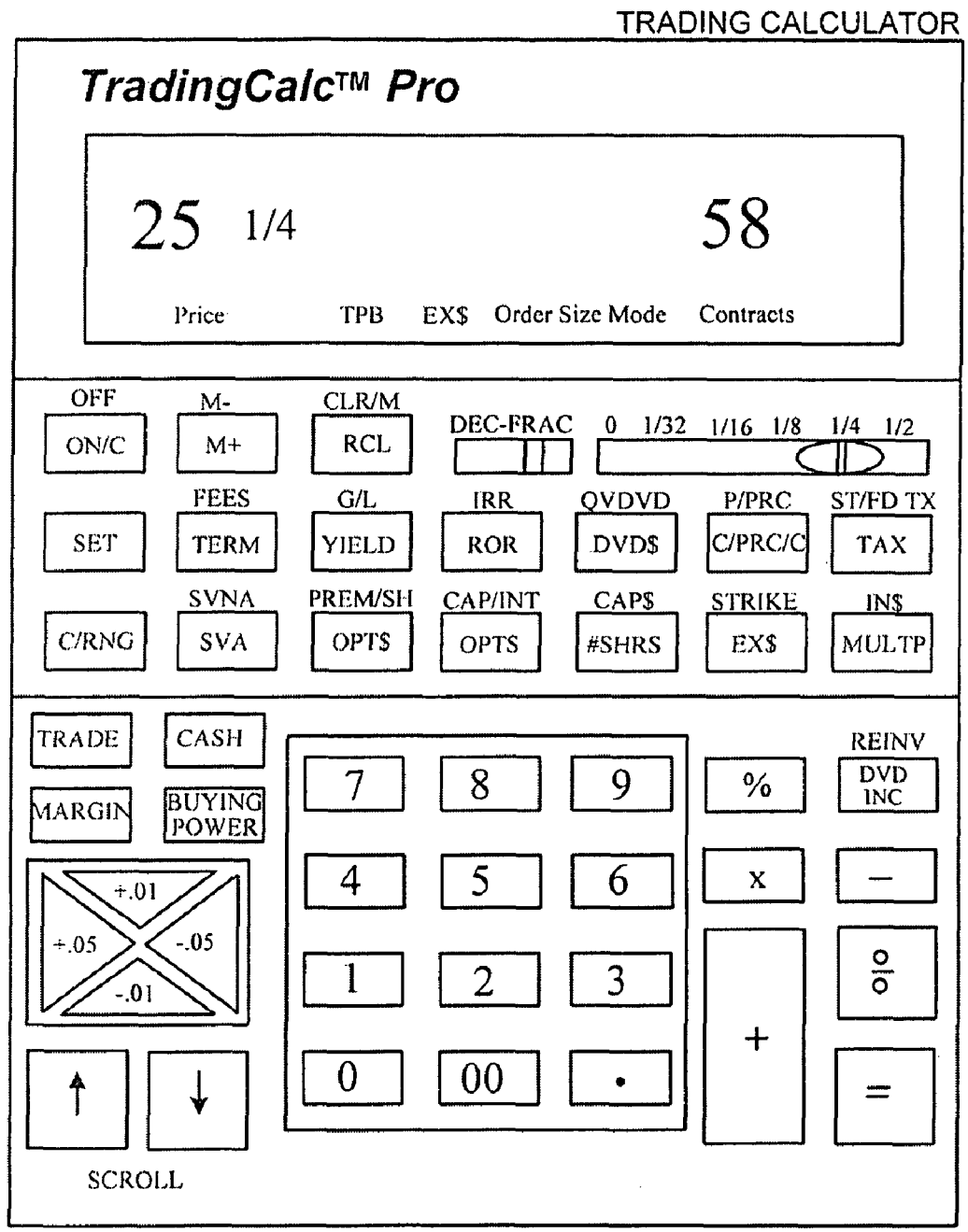
Figure 1C:
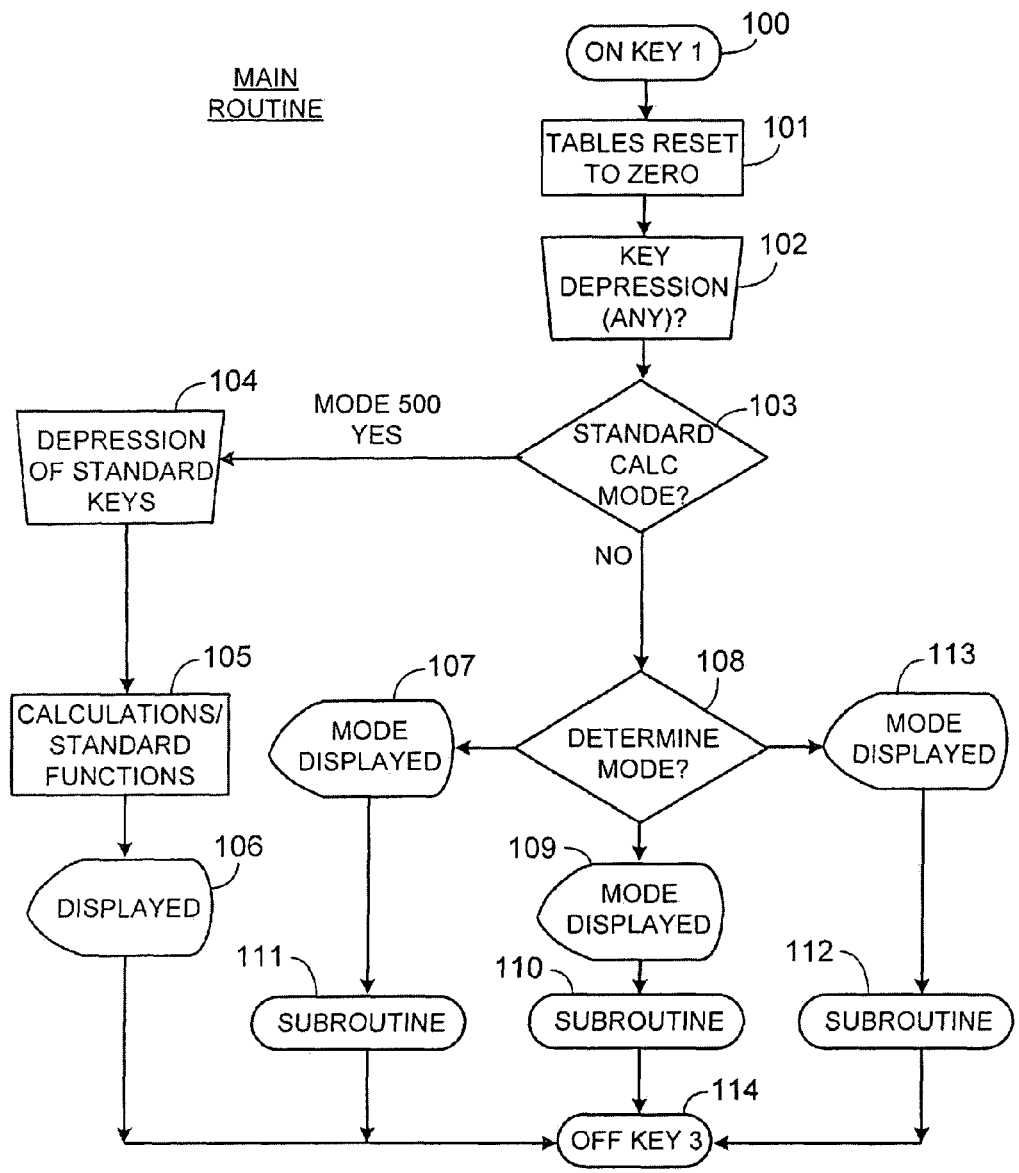
Figure 1D:
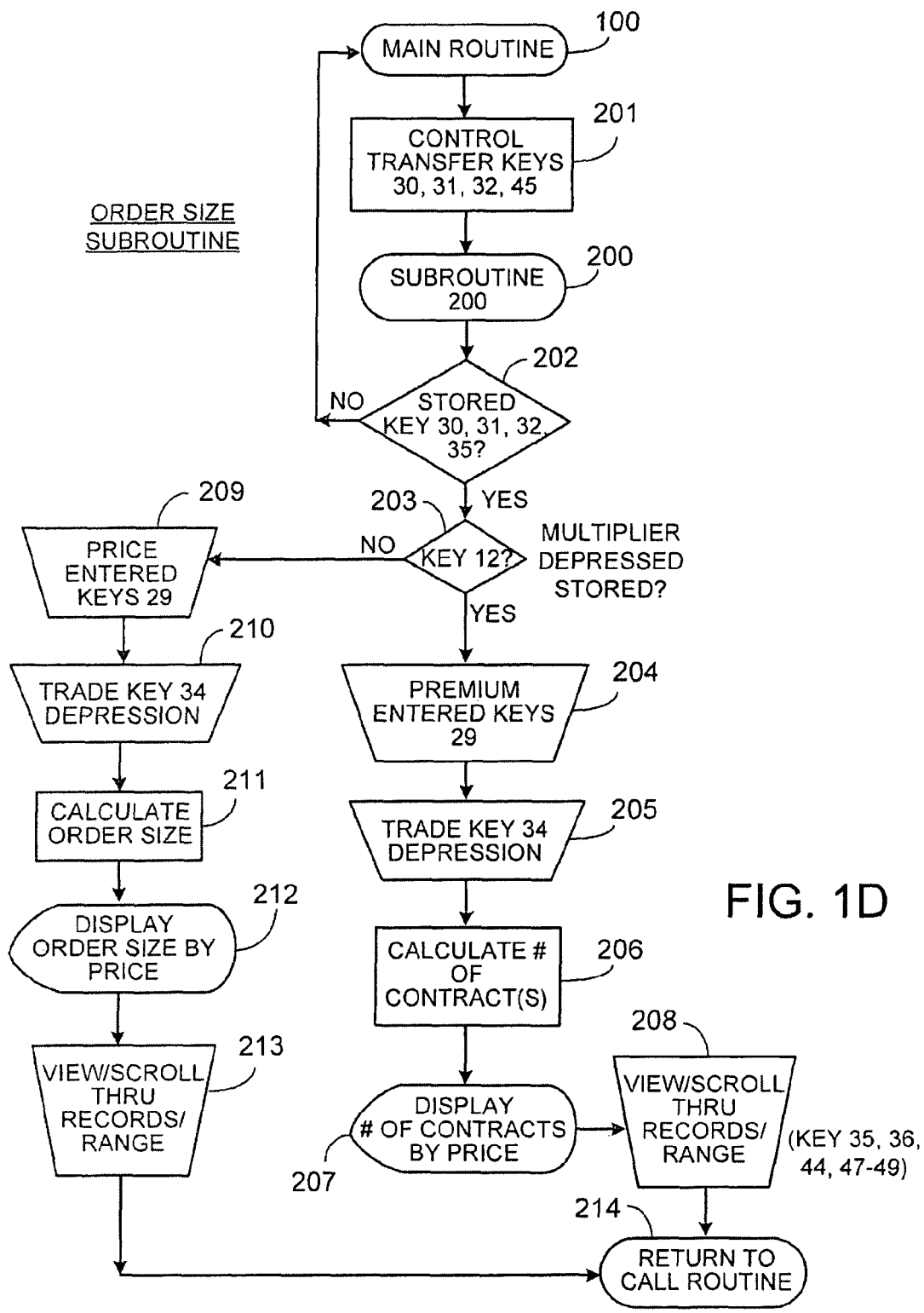
Figure 1E:
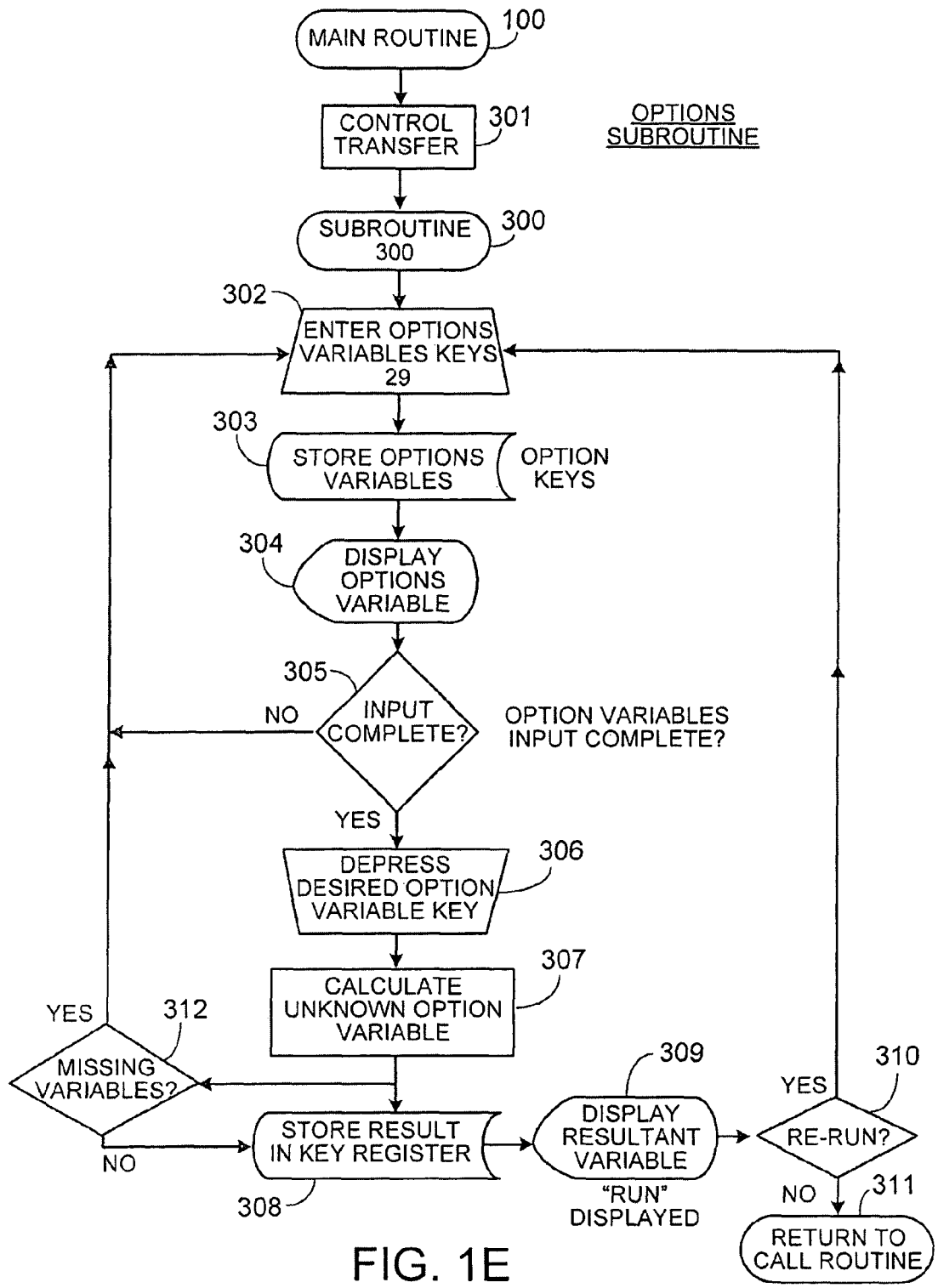
Figure 1F:
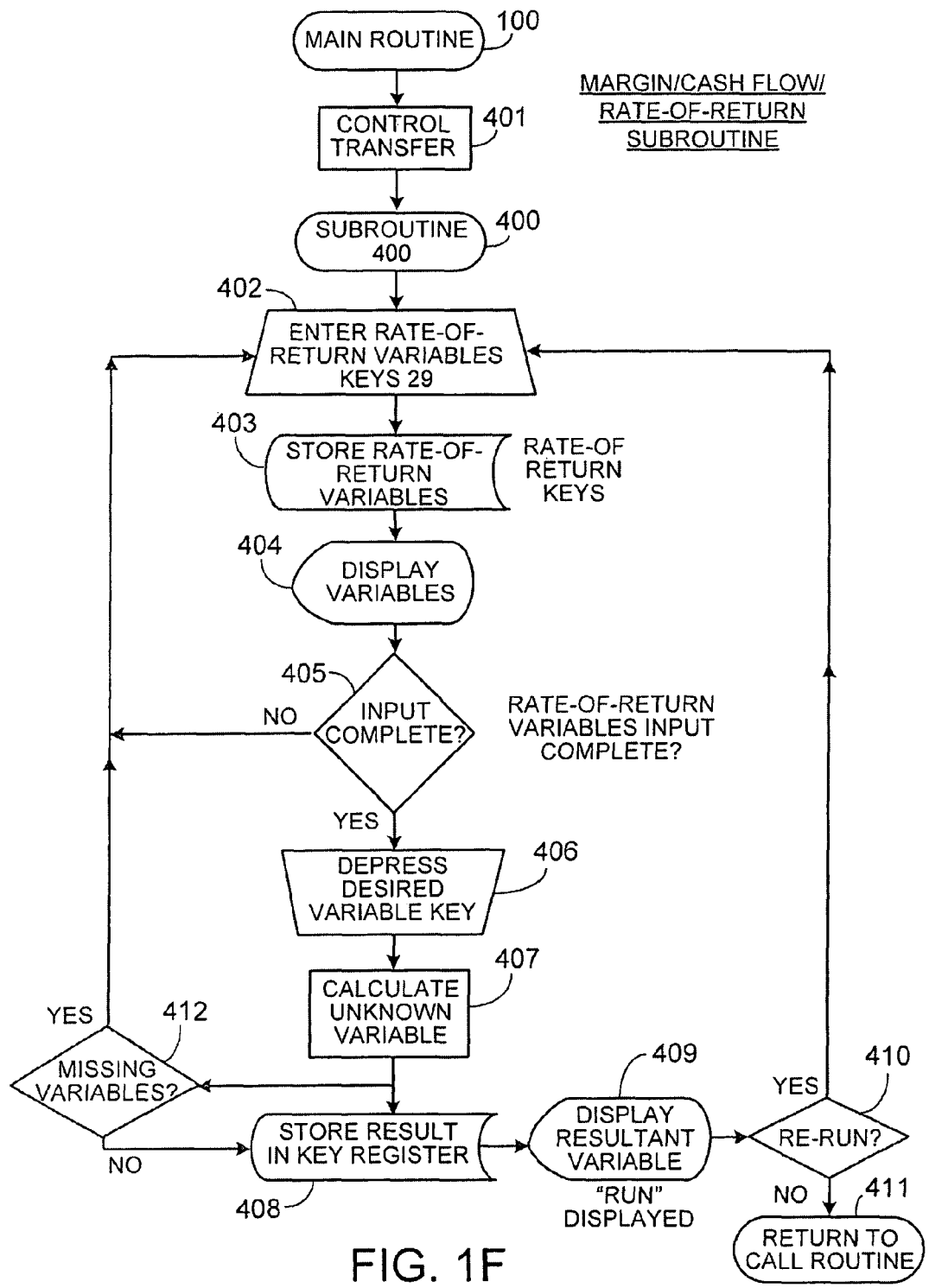
Figure 1G:
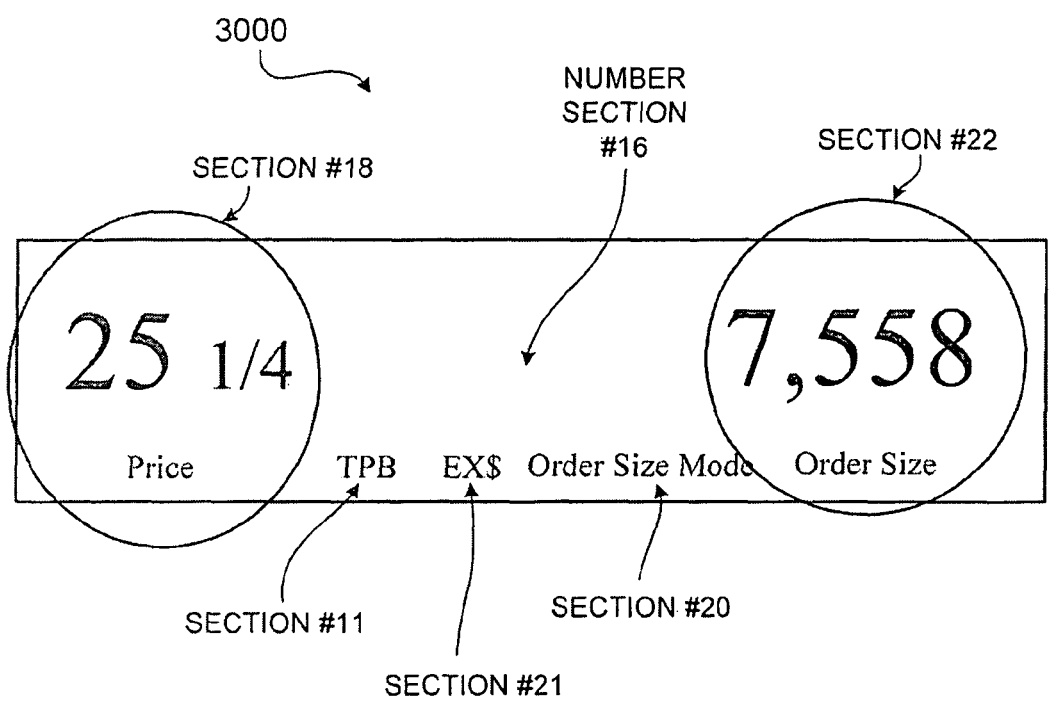

FIG. 1A is a front view of the calculator of the present invention showing trade price and calculated order size;

FIG. 1B is a front view of the calculator of the present invention showing premium and calculated number of contracts;

FIG. 1C is a flow chart illustrating the program flow of the "main" routine of the calculator;

FIG. 1D is a flow chart illustrating the program flow of the "order size" subroutine of the calculator;

FIG. 1E is a flow chart illustrating the program flow of the "option" subroutine;

FIG. 1F is a flow chart illustrating the program flow of the "margin/cash flow/rate-of-return" subroutine;

FIG. 1G is a front view of the display that shows sections and annunciators/indicators.

TRADING CALCULATOR—BASIC/CORE CONCEPT MODEL (pocket, hand held, or small desktop styles)

Figure 2A:
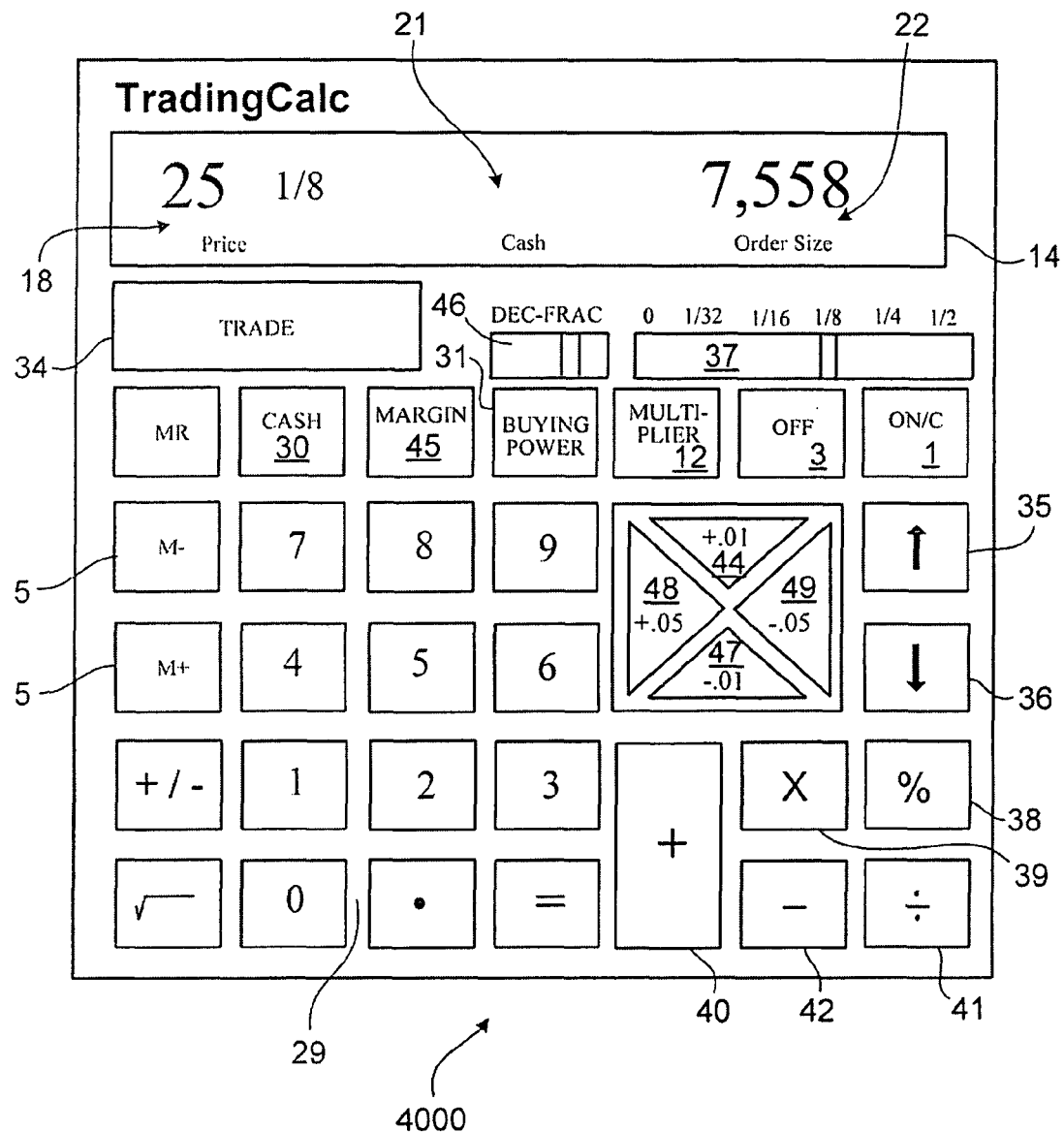
Figure 2B:
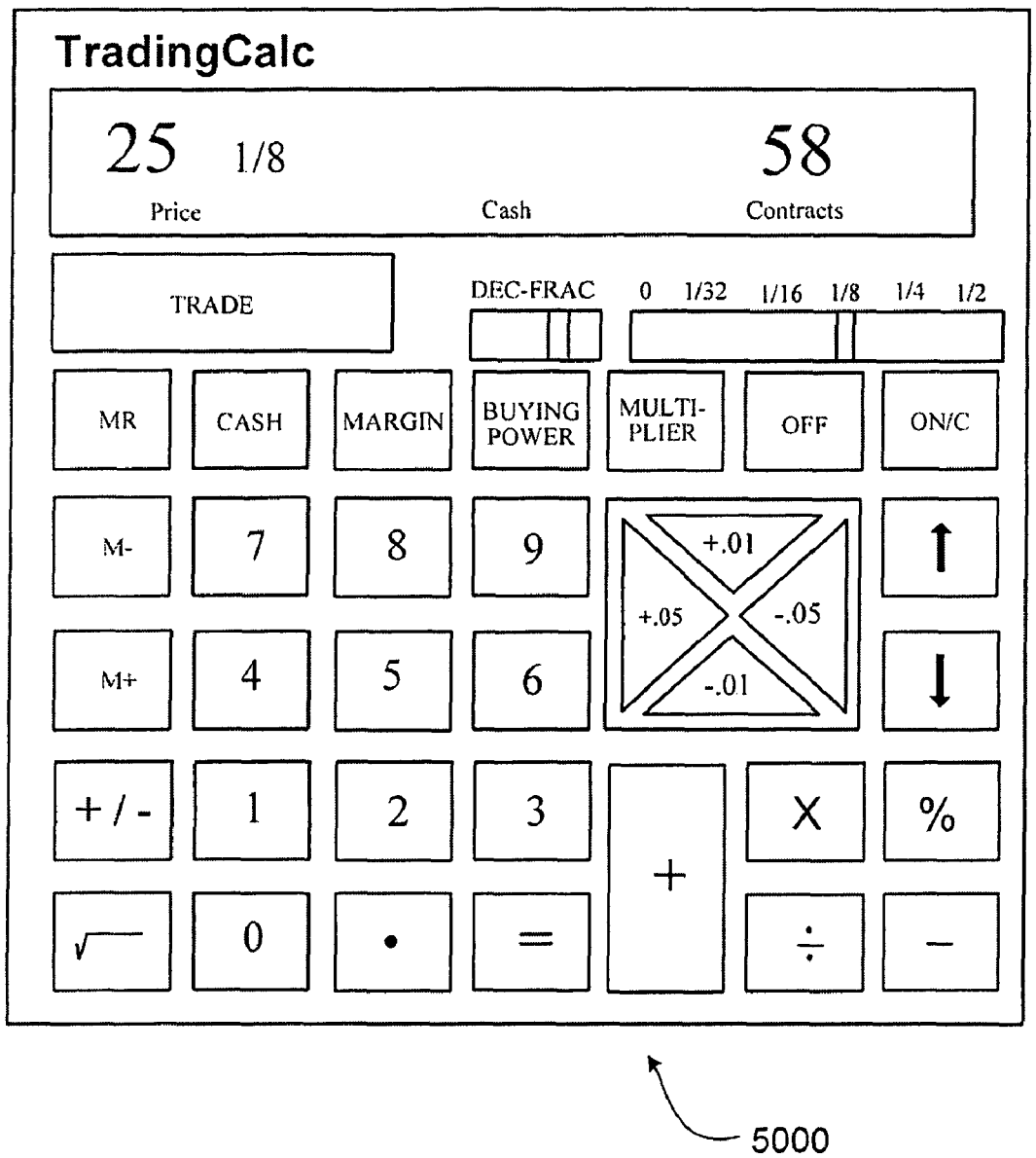

FIG. 2A is a front view of the calculator of the present invention showing trade price and calculated trade order size;

FIG. 2B is a front view of the calculator of the present invention showing premium and calculated number of contracts.

FIGS. A through O are screenshots from the "Basic/Core Concept" model calculator to illustrate some of the various uses of the preferred embodiment in accordance with the present invention. These screenshots are described below:

FIG. A—is a front view of the calculator of the present invention showing . . . a resultant variable/or dollar amount stored (in decimal format) when "BUY" key 7 is depressed.

FIG. B—is a front view of the calculator of the present invention showing . . . a resultant variable/or dollar amount stored (in fractional format) when "BUY" key 7 is depressed.

FIG. C—is a front view of the calculator of the present invention showing . . . the dollar amount stored when "CASH2" set key 9 is depressed ("CASH" key 9 would appear in a similar manner).

FIG. D—is a front view of the calculator of the present invention showing . . . the number of contracts by premium in a decimal format.

FIG. E—is a front view of the calculator of the present invention showing . . . the number of contracts by premium in a fractional format.

FIG. F—is a front view of the calculator of the present invention showing . . . the number stored when "Multiplier2" set key 7 is depressed ("Multiplier1" set key 6 would appear in a similar manner).

FIG. G—is a front view of the calculator of the present invention showing . . . the order size by price in decimal format.

FIG. H—is a front view of the calculator of the present invention showing . . . the order size by price in fractional format.

FIG. I—is a front view of the calculator of the present invention showing . . . a rate-of-return or margin resultant variable (Profit %) or, Profit % stored (as a percent), when other variables are entered (such as "BUY" and "SELL" amounts) and the "Profit %" set key 8 is depressed. This is a profit margin calculation expressed as a percent and is shown as a positive number in FIG. 1.

FIG. J—is a front view of the calculator of the present invention showing . . . a rate-of-return or margin resultant variable (Profit %) or, Profit % stored (as a percent), when other variables are entered (such as "BUY" and "SELL" amounts) and the "Profit %" set key 8 is depressed. This is a profit margin calculation expressed as a percent and is shown as a negative number in FIG. J.

FIG. K—is a front view of the calculator of the present invention showing . . . a rate-of-return or margin resultant variable (Profit, in dollars) or, Profit amount stored (in dollars) when other variables are entered (such as "BUY", "SELL", "CASH") and the "Profit" key 8 is depressed. This is a gain & loss calculation expressed in dollars, shown in FIG. K as a positive number.

FIG. L—is a front view of the calculator of the present invention showing . . . a rate-of-return or margin resultant variable (Profit, in dollars) or, Profit amount stored (in dollars), when other variables are entered (such as "BUY", "SELL", "CASH") and the "Profit" key 8 is depressed. This is a gain & loss calculation expressed in dollars, shown in FIG. L as a negative number.

FIG. M—is a front view of the calculator of the present invention showing . . . a fractional amount that is being selected by the user, using up/or down arrow key(s) 11 and 12 in combination with key(s) 13 and 14. The user can select a number by scrolling up/or down, and then enter it by depressing the BUY key 7, or SELL key 6, for example.

FIG. N—is a front view of the calculator of the present invention showing . . . a resultant variable/or dollar amount stored (in decimal format) when the "SELL" key 6 is depressed.

FIG. O—is a front view of the calculator of the present invention showing . . . a resultant variable/or dollar amount stored (in fractional format) when the "SELL" key 6 is depressed.

DETAILED DESCRIPTION OF THE INVENTION

A calculator constructed in accordance with a preferred aspect of the invention is illustrated in FIG. 1A and generally designated 1000. The calculator includes a body or housing 1012 supporting a keypad 13 and a display 14. The display includes a number section 16, a trading price/premium section 18, an order size/or number of contract(s) section 22, a mode type (order size, rate of return, option variables) section 20, cash type section 11 (cash $, margin $, total buying power $), and a key indication (section 20, when operating trade order size, options and rate of return modes. The display also includes a plurality of annunciators/indicators. The calculator 1000 is illustrated in FIG IA in a configuration that is conventional in the art. Specifically, the keypad 13 and the display 14 are both connected to a processor 15. A storage device 17 is also connected to the processor 15. The processing functions described in this application are carried out by the processor 15; and storage functions are accommodated in storage device 17. When operating in the calculator mode, display 14 displays numbers in conventional fashion.

Again, the portable handheld calculator and several models of the preferred embodiment is just one example of a handheld computing device having a software application in accordance with the present invention. As is well known to those of ordinary skill in the art, a handheld computing device, such as a calculator, typically comprises (but is not limited to) an electrical circuit having a processor electrically coupled to a memory device, as well as a display screen and an input device electrically coupled to the electrical circuit. For illustration purposes, the electrical circuit is shown schematically outside of the calculator, even though the electrical circuit is actually within and part of the calculator in this example. A handheld computing device in accordance with an embodiment of the present invention also comprises at least one software application stored in the memory device that is adapted to be executed by the processor. The memory device, processor, display screen, input device, and software application, each may vary for a given application. Consider the following examples illustrating some variations of these components for a variety of handheld computing devices, which are just a few examples and are not intended to limit the scope of a claimed invention herein.

The handheld computing device may be adapted to connect to a television, personal computer, or other trading and investment display (not shown), so that these items provide a display screen or a duplicate image of the display screen on the computing device, for example. The display screen may comprise an active matrix display device (not shown). Also, the display screen and the input device may be integral with one another. For example, if the display screen comprises a touch sensitive screen (not shown) that allows inputs to be received by touching the screen with a finger or a touch wand (not shown), the input device may be a simulated keypad displayed on the touch sensitive screen. Such displays are often used in portable palm-sized computer devices for example. If the handheld computing device is a cellular telephone, for example, the input device may include the key pad normally used for dialing telephone numbers.

A portable handheld calculator, such as the one shown, may be battery powered, solar powered, and/or powered by an AC/DC converter that can be plugged into an AC wall outlet. In the figures, the display screen of the calculator has a liquid crystal display (LCD). The memory device comprises a flash memory device, which stores the software application, among other tasks. The input device comprises a keypad device with a variety of buttons. The input device may also comprise "soft keys", which correspond to buttons whose function may change to suit a given software application. If the user presses a button below the displayed soft key, it will provide the input displayed on the soft key; such button depressions will be interpreted by the software application as the user's desire to switch modes, as discussed further below, for example.

The keys supported within the body of the "Basic/Core Concept Model" calculator are as follows:

TABLE 2

Basic/Core Concept Model

| Key | Designating Numeral |
|---|---|
| ON/C | 1 |
| % or SET | 2 |
| M− | 3 |
| M+ | 4 |
| MEMORY RECALL (MRC) | 5 |
| SELL | 6 |
| MULTIPLIER1 | set 6 |
| BUY | 7 |
| MULTIPLIER2 | set 7 |
| PROFIT (gain/loss; in dollars) | 8 |
| PROFIT % (as a percent) | set 8 |
| CASH (in dollars) | 9 |
| CASH2 (in dollars) | set 9 |
| INDIVIDUAL NUMBERS | 30 |
| TRADE (dedicated execution key) | 10 |
| SCROLL UP (decimal/or fractional increments) | 11 |
| SCROLL DOWN (decimal/or fractional increments) | 12 |
| FRACTION INDICATOR/SELECTOR (0, 1/64$^{th}$, 1/32$^{nd}$, 1/16$^{th}$, 1/8$^{th}$, 1/4$^{th}$, 1/2) | 13 |
| DECIMAL-FRACTION MODE SWITCH | 14 |
| × | 15 |
| + | 16 |
| DIVIDE (/) | 17 |
| − | 18 |
| = | 19 |

The function of these keys is explained in conjunction with the flow charts and front-views shown in the drawings for the "Basic/Core Concept Model".

TABLE 1

The keys supported within the body of the calculator are as follows:

| Key | Designating Numeral |
|---|---|
| ON/C | 1 |
| SET | 2 |
| OFF | 3 |
| M− | set 5 |
| M+ | 5 |
| CLEAR RANGE (C/RNG) | 6 |
| RECALL (RCL) | 7 |
| CLEAR MEMORY (CLR/M) | set 7 |
| IN-THE-MONEY (IN$) | set 12 |
| SETTLEMENT VALUE-AUTO (SVA) | 9 |
| SETTLEMENT VALUE-NON AUTO (SVNA) | set 9 |
| MULTIPLIER (MULTP) or (MULTIPLIER) | 12 |
| RETURN % (ROR) | 13 |
| YIELD % (YIELD) | 16 |
| INTERNAL RATE OF RETURN % (IRR) | set 13 |
| OPTION$ (OPT$) | 4 |
| PURCHASE PRICE (P/PRICE) | set 10 |
| CURRENT PRICE (C/PRICE) | 10 |
| NUMBER OF OPTIONS (# OPTS) | 8 |
| GAIN/LOSS (G/L) | set 16 |
| PREMIUM PER SHARE (PREM/SH) | set 4 |
| FEES (FEES) | set 21 |
| CAP INTERVAL (CAP INT) | set 8 |
| TOTAL DIVIDENDS (DVD$) | 20 |
| TOTAL DIVIDEND RE-INVESTMENT % (REINV) | set 14 |

TABLE 1-continued

The keys supported within the body of the calculator are as follows:

| Key | Designating Numeral |
|---|---|
| TOTAL DIVIDEND INCOME (DVD INC) | 14 |
| NUMBER OF MONTHS (TERM) | 21 |
| CAP AMOUNT (CAP$) | set 27 |
| STRIKE PRICE (STRIKE) | set 23 |
| EXERCISE PRICE (EX$) | 23 |
| AVG QUARTERLY DIVIDEND (QDVD) | set 20 |
| TOTAL TAX % (TAX) | 25 |
| STATE & FEDERAL TAX % (ST/FD TX) | set 25 |
| NUMBER OF SHARES (#SHRS) | 27 |
| INDIVIDUAL NUMBERS | 29 |
| TOTAL CASH (CASH) | 30 |
| TOTAL MARGIN (MARGIN) | 45 |
| TOTAL BUYING POWER (BUYING POWER) | 31 |
| TOTAL OPTION MONEY (OPT$) | 32 |
| TO (TO) | 33 |
| DEDICATED EXECUTION KEY (TRADE) | 34 |
| SCROLL UP | 35 |
| SCROLL DOWN | 36 |
| FRACTION INDICATOR/SELECTOR ($0, 1/32^{nd}, 1/16^{th}, 1/8^{th}, 1/4^{th}, 1/2$) | 37 |
| DECIMAL-FRACTION MODE SWITCH | 46 |
| % | 38 |
| × | 39 |
| + | 40 |
| DIVIDE (/) | 41 |
| − | 42 |
| = | 43 |
| +.01 Increment Speed Key | 44 |
| −.01 Increment Speed Key | 47 |
| +.05 Increment Speed Key | 48 |
| −.05 Increment Speed Key | 49 |

The function of these keys is explained in conjunction with the flow charts and front-views shown in the drawings.

The calculator has been designed so that a trading price/or premium or trading price/or premium range can be entered and determined using several different methods:

1. Manually by the user (using dedicated or non-dedicated switches or keys)
2. determined internally by processor means with input from user
3. by using price/premium increment(s) using special "speed key(s)" or "up/down arrow keys" where an increment is added to the current price/or premium to arrive at a new price/or premium
4. or any combination of these method #'s 1-3.

For method #1 or #2 above, the calculator may include a table of whole numbers from 1 through 1000 (WN-LU). When the user enters an individual trading price/or trading price range (current price or premium) by way of HIGH-PRICE and LOW-PRICE internal variables, the calculator will use table WN-LU to determine the whole numbers between LOW-PRICE and HIGH-PRICE in order to create table LU1 (LOW-PRICE and HIGH-PRICE numbers are included in table LU1 in addition to the whole numbers between LOW-PRICE and HIGH-PRICE). It should also be noted that prices and price ranges can also be determined internally by processor means with the entry of just one of these LOW-PRICE or HIGH-PRICE variables. Manually entering a user-defined range is an option, and certainly not a required method. These whole numbers/or prices will then be used in table LU1 to determine fractional price/or premiums within a price/or premium range. For example, a portion of table WN-LU is shown:

TABLE WN-LU

Whole Number Table (1-1000)

1
2
3
4
5
6
7
8
9
10
11
12
13
... up to 1000

Trading price table (LU1) may store the trading price/or premium derived from table WN-LU, Fraction Indicator/Selector (key 37), manual input, and internal processor means. Table LU1 may also store the price/or premium range of numbers that was determined manually, or internally by the calculator's processor means. Table LU1 accommodates the fractional increment selected by the user (key 37) and with processor means or manual input, determines prices/and premiums within a a price/or premium range.

Each price/or premium included in the range determined in Table LU1 is then divided by the stored amount for total cash, margin, option, or buying power (keys 30,31,32,45) depending on which one is selected by the user. This division creates an associated trade order size table (LU2) that is displayed (display 14), and can be viewed by the user by scrolling up (key 35) or scrolling down (key 36), or using Increment Speed Keys (keys 44,47,48,49).

The Fractional Indicator/Selector (key 37) can select a variety of fractions, the most common will be increments of $1/32^{nd}$'s, $1/16^{th}$'s, $1/8^{th}$'s, $1/4^{th}$'s, $1/2$'s, and; decimal equivalents of fractions can also be displayed as an option, instead of displaying fractions, i.e. 1.250 instead of $1\frac{1}{4}^{th}$.

The Decimal-Fraction Mode Switch (switch/key 46) determines the mode of the calculator, and whether or not decimals or fractions will be displayed. If switch/key 46 is set to fraction, the calculator uses input from the fractional indicator/selector (key 37) to determine the price/or price range, and the user can then view/scroll through records using up/down arrow keys (keys 35 or 36). If switch/key 46 is set to decimal, the calculate uses manual input from the user to determine an internal price range where the user can then view/scroll through records by decimal increment(s) using Speed Keys (keys 44,47,48,49); it should be noted that instead of processor means determining an internal price range, price increments can be used as a method to quickly determine prices/or premiums with associated order size, number of options/or contracts.

TABLE LU1

(EXAMPLE; 30-32 by ¼)

| Whole Number | Price/or Premium |
|---|---|
| 30 | 30¼ |
|  | 30½ |
|  | 30¾ |
| 31 | 31 |
|  | 31¼ |
|  | 31½ |
|  | 31¾ |
| 32 | 32 |

Continuing on with this example, if the total buying power (TBP$ key 31) was set and stored as $76,840.00, then each fractional number of table LU1 would be divided into $76,840.00, thereby calculating (EQU1) an associated trade order size that can be purchased (always rounded down to the nearest whole number for each trading price). Table LU2 would then become:

TABLE LU2

(EXAMPLE; 30-32 by ¼)

| Price/or Premium | Trade Order Size |
|---|---|
| 30¼ | 2540 |
| 30½ | 2519 |
| 30¾ | 2498 |
| 31 | 2478 |
| 31¼ | 2458 |
| 31½ | 2439 |
| 31¾ | 2420 |
| 32 | 2401 |

The first entry in table LU2 will be displayed by the calculator (only fractional price and trade order size. Fractional premium and number of option(s)/or contract(s) would be the only two variables displayed when calculating the number of option(s) or contract(s). To view/scroll through the table, the user would use keys 35 and 36. To adjust table LU1 and LU2 respectively, the user can clear the trading price range by depressing ON/C (key 1) or C/RNG (key 6), and then re-key a new individual trading price or price range by using the TO (key 33), individual numbers (keys 29), and TRADE (key 34). An individual price can be entered instead of a price range by using keys 29 and depressing TRADE (key 34). In addition, as already mentioned above, entering a price range manually (with a separator) is not required; the processor means can determine a price range internally when the user enters a single price, or increments can be used. These order sizes and fractional numbers are permanently embodied in read-only memory (ROM), and the user cannot edit them. The user can edit/or change them by entering a new price/or price range as mentioned above using the nonvolatile area of random-access memory (RAM). Default values for tables LU1 and LU2 are zero.

If an individual trading price was entered by the user, tables LU1 and LU2 would only have one record each.

Another example like the creation of table LU2, is when a user wants to calculate the number of option(s) or contract(s) he/she can purchase. If the trading premium range of 30-40 was selected as shown in the above example, and the total money (keys 30,31,32,45) was set and stored as above ($76,840), and an option multiplier of 100 was set and stored (key 12) then tables WN-LU and LU1 would be created exactly as shown above. Table LU2, although, would have an additional column of data that would store the number of contract(s) [rounding down as stated above]. This is shown below in Table LU3. The number of contract(s) is calculated (EQU2) by dividing the trade order size (in LU2) by the stored option multiplier (key 12):

TABLE LU3

(EXAMPLE; 30-32 by ¼)

| Premium | Trade Order Size | Number of Contracts |
|---|---|---|
| 30¼ | 2540 | 25 |
| 30½ | 2519 | 25 |
| 30¾ | 2498 | 24 |

TABLE LU3-continued (EXAMPLE; 30-32 by ¼)

| Premium | Trade Order Size | Number of Contracts |
|---|---|---|
| 31 | 2478 | 24 |
| 31¼ | 2458 | 24 |
| 31½ | 2439 | 24 |
| 31¾ | 2420 | 24 |
| 32 | 2401 | 24 |

The user can then view/scroll through each record that displays premium and number of contract(s) by using up/down arrow keys (keys 35, 36) or speed keys (keys 44,47, 48,49) in combination with selector keys 37 and 46.

Again, for method #3 aforementioned, instead of using a price/or premium range (manually or internally set by processor means), prices/or premiums can be changed using incremental speed keys (keys 44,47,48, 49) where increments are added to prices/or premiums to arrive at a new price/or premium. For example, with the Decimal-Fraction Mode Switch (key 46) set to Decimal and the amount of money being trade previously entered (keys 30, 31, 32, 45), the user could then enter 25.23 using the keypad (key 29) followed by depression of the TRADE key 34.

At this point the first display signal would be shown, and the display indicators would correlate to either premiums/contracts or price/order size depending on whether or not the multiplier (key 12) was depressed or not with a previously stored entry; when key 12 is depressed, the calculator determines the number of contracts instead of the order size as shown in Table LU3. In this example, let's assume that key 12 was not depressed and there was nothing stored in key 12. Internal calculations would be like those shown in Table LU2 using $76,840 as the stored amount of cash (key 30). $76,840 (stored key 30) divided by a price of 25.23 equals 3045.58, rounded down to 3045.

Display Example

Order Size

| 25.23 Price | Cash | 3045 Order Size |
|---|---|---|

At this point, the user could then depress a+0.01 increment (key 44). A second display signal would then be shown where 0.01 is added to 25.23 arriving at a new price/or premium 25.24. Again, $76,840 (stored key 30) now divided by 25.24 to equal 3044.37, rounded down to 3044.

Display Example

Order Size

| 25.24 Price | Cash | 3044 Order Size |
|---|---|---|

Continuing on with this example, the user could now depress a +0.05 increment (key 48). Another display signal would then be shown where 0.05 is added to the last price shown, 25.24, thus arriving at a new price 25.29. Again, $76,840 (stored key 30) now divided by 25.29 to equal 3038.35, rounded down to 3038.

Display Example

Order Size

| 25.29 | | 3038 |
|---|---|---|
| Price | Cash | Order Size |

The number of contracts can be determined by increments in the same manner when multiplier (key 12) is depressed, and has a stored entry. Display indicators correlate to price/order size or premium/contracts accordingly.

These last several examples had the Decimal-Fraction Mode Switch (key 46) set to "Decimal". When the Decimal-Fraction Mode Switch (key 46) is set to "Fraction" and the amount of money being traded was previously entered (keys 30, 31, 32, 45), the user could then select a pre-defined fractional increment from Fraction Indicator/Selector (key 37), and then enter a number using the keypad (keys 29) followed by depression of the TRADE (key 34). At this point the first display signal would be shown, and the display indicators would correlate to either premiums/contracts or price/order size depending on whether or not the multiplier (key 12) was depressed or not with a previously stored entry; when key 12 is depressed, the calculator determines the number of contracts instead of the order size as shown in Table. LU3. In this example, let's assume that key 12 was not depressed and there was nothing stored in key 12, that the Fraction Indicator/Selector (key 37) was set to $1/4^{th}$, the Cash (key30) had $76,840 previously entered and was depressed, and the Decimal Fraction Mode Switch (key 46) was set to "Fraction". At this point, the user enters the number 30 on the keypad (key 29) and then depresses the TRADE (key 34). Internal calculations would be those shown in Table LU2 using $76,840 as the stored amount of cash (key 30). The first display signal would be:

Display Example

Order Size

| 30¼ | | 2540 |
|---|---|---|
| Price | Cash | Order Size |

At this point, the user could then depress the up/or down arrow scroll (keys 35,36) to view/scroll through records by the pre-defined fractional increment already selected by Fraction Indicator/Selector (key 37). At this point, if the user depressed the up arrow (key 35) key once, a second display signal would then be shown as in Table LU2:

Display Example

Order Size

| 30½ | | 2519 |
|---|---|---|
| Price | Cash | Order Size |

The user can continue on, viewing/scrolling up or down in the price/or premium range using this methodology, or clear the range and select a new price or price range. The price range can be determined using a variety of methods, and is not limited.

In addition, when the Decimal-Fraction Mode Switch (key 46) is set to "Fraction", the user also has the option to select and then enter a fractional number into other key registers, or enter the trade "Order Size Mode" by depressing the TRADE (key 34). For example, a user may want to enter a fractional number into a BUY or SELL key register (keys 6 and 7; table 2; "Basic/Core Concept Model"), in order to calculate the PROFIT (key 8; table 2; "Basic/Core Concept Model") in dollars. This is a "Rate-of-Return Mode" or "Investment Mode" calculation, and not a calculation performed while in trade "Order Size Mode". The user would enter a whole number using the keypad (keys 30), and then depress an up/or down arrow key (keys 11 and 12; table 2; "Basic/Core Concept Model") or speed key, in order to scroll through a range of numbers each shown on the display screen, together with fractions. When the user finally increments to the number (including fraction) he/she is looking for, that number is then selected and entered into a BUY or SELL key register by depressing the corresponding BUY or SELL button, for example. In this example, fractional numbers would be selected and entered into BUY and SELL key registers, and then the user would depress the PROFIT (key 8; table 2; "Basic/Core Concept Model") key to obtain a resultant variable displayed in dollars. The "RUN" indicator would be displayed during the calculation. This example assumes that other variables such as CASH (key 9; table 2; "Basic/Core Concept Model") were previously entered and stored, so the calculation would not error.

Because the FRACTION INDICATOR/SELECTOR (key 13; table 2; "Basic/Core Concept Model") has the possibility to increment in $32^{nd}$'s or $64^{th}$'s, selecting a fraction of $35/64$ would take a user approximately 35 depressions of the UP ARROW key, before depressing the desired button to select and store a number (BUY or SELL keys, for example) of 40 and $35/64$, for example. The user would enter 40 on the keypad, followed by multiple depressions of the UP ARROW key in order to arrive at 40 $35/64$, to be selected and then stored. A shortcut exists on the device to speed this data entry. Using the same FRACTION INDICATOR of $64^{th}$'s, for example, a user that wants to enter a fractional number of 40 $35/64$ very quickly, could enter 40.50 on the keypad, followed by depressing the UP ARROW key three (3) times. The first display signal in this example would be 40 $33/64$ (which is one $64^{th}$ increment above 40.50), followed by a second display signal of 40 $34/64$, and a final display signal of 40 $35/64$, whereby this final number could then be selected and entered into any key register the user chooses, BUY or SELL key registers, for example. If the user decided to depress the TRADE key instead of the BUY key, the device would enter the trade "Order Size Mode", with a first display signal showing $40 35/64 as the price/or premium together with the associated trade order size or number of trade contract(s). The user could then continue to scroll using UP/or DOWN arrow keys in "Order Size Mode".

I. Main Routine

Program flow of the main routine <100> is illustrated in FIG. 1C. The calculator is powered on by depressing ON/C key 1. Tables WN-LU,LU1,LU2,LU3 are reset <101> to the default values of 0. A hard reset is only performed when the batteries are removed. At this point, any keys can be depressed <102>. The calculator determines <103> if standard calculator functions will be performed. If they are, standard keys are depressed <104>, calculated <105>, and displayed <106>. If standard calculator functions are not to be performed <103>, the mode then needs to be determined <108>. The default mode <104> is calculator mode 500. Depressing TBP$ key 31, CASH$ key 30, or OPTION$ key 32, or MARGIN$ key 45 places the calculator in trading order size mode 200. Depressing keys 4,8,9,12,23 and set keys 4,8,9,12,23,27 places the calculator in options trade mode 300, and depressing keys 10,13,14,16,21,25 and set keys 10, 13, 14, 16, 20, 21, 25 places the calculator in rate of return mode 400. At any time during the operation of the calculator, any of the above keys can be depressed whereupon the calculator enters the corresponding mode 200,300,400, or 500. The mode is then displayed <107,109,113> on display 14 (section 20). The main routine 100 will process trade order sizes <111> including number of option(s) or contract(s), option trading variables <110>, margin/percentage/cash flow/rate of return variables <112>, and standard calculator functions <104>. The calculator is powered off <114> by depressing the OFF key 3. In order to facilitate a precise description of the operation of the calculator, the following internal variables will be used:

INTERNAL VARIABLES 1-1

| Variable | Description |
|---|---|
| High-Price | High trading price of range, user-defined |
| Low-price | Low trading price of range, user-defined |
| FRA CP | Fractional trading price (internal table LU1) |
| FRA CIND | Fractional indicator/setting (stored key 37) |
| ORDSZ | Trade order size (internal table LU2) |
| MULTP | Option multiplier (stored key 12) |
| WN | Whole number (internal table WN-LU) |
| NOOPS | Number of contracts (internal table LU2) |
| CASH$ | Total cash money (stored key 30) |
| MARGIN$ | Total margin money (stored key 45) |
| TBP$ | Total buying power money (stored key 31) |
| OPT$ | Total option money (stored key 32) |
| OPT1 | Premium per share (stored key set 4) |
| OPT2 | Total option money (stored key 4) |
| OPT3 | in money (stored key set 12) |
| OPT5 | cap interval (stored key set 8) |
| OPT6 | # of options (stored key 8) |
| OPT7 | cap price (stored key set 27, EQU27) |
| OPT8 | # of shares (stored key 27) |
| OPT9 | strike price (stored key set 23) |
| OPT10 | exercise price (stored key 23, EQU8, 10) |
| OPT11 | settlement value (stored key 9, EQU34) |
| OPT13 | settlement value (stored key set 9, EQU33) |
| OPT12 | multiplier (stored key 12) |
| OPT14 | option money (stored key 4, EQU4) |
| ROR1 | fees total (stored key set 21) |
| ROR2 | term/months (stored key 21) |
| ROR3 | yield % (stored key 16, EQU79-80) |
| ROR4 | annualized return % (stored key 13, EQU51-62) |

INTERNAL VARIABLES 1-1

| Variable | Description |
|---|---|
| ROR5 | avg qtrly dividend (stored key set 20) |
| ROR6 | total dividends (stored key 20, EQU15-16) |
| ROR26 | total dividend income (stored key 14) |
| ROR17 | total dividend re-investment % (stored key set 14) |
| ROR7 | current price (stored key 10, EQU63-74) |
| ROR8 | purchase price (stored key set 10) |
| ROR10 | IRR % (stored key set 13, EQU#-#) |
| ROR11 | gain/loss total (stored set key 16, EQU75-78) |
| ROR12 | EQU23 result (stored internally, fees/share) |
| ROR13 | EQU24 result (stored internally, g/l per share) |
| ROR14 | EQU25 result (stored internally, total divd/share) |
| ROR15 | EQU26 result (stored internally, tax calc) |
| ROR18 | EQU36 result (stored internally, divd/share/year) |
| ROR16 | EQU35 result (stored internally, net cash flow) |
| ROR20 | ending balance (stored internally, EQU37) |
| ROR21 | beginning balance (stored internally, EQU38) |
| ROR19 | dividend reinvested income (stored key 14, EQU83-84) |
| ROR9 | total tax % (stored key 25) |
| ROR22 | ROR % conversion (stored internally, EQU5) |
| ROR23 | REINV % conversion (stored internally, EQU7) |
| ROR24 | IRR % conversion (stored internally, EQU9) |
| ROR25 | total state/federal tax (stored key set 25) |
| ROR27 | YIELD % conversion (stored internal, EQU11) |

II. Trading Order Size Mode

The main routine <100> transfers control <201> (FIG. 1D) to the trading order size subroutine <200> when TBP$ key 31, CASH$ key 30, OPTIONS key 32, or MARGINS key 45 <201> is depressed. This subroutine processes the amount stored in the key register (key 30, 31, 32, 45). If the key register does not contain a number <202>, the control is immediately returned to the main routine <100>. If the key register does contain an amount in register 30, 31,32, 45, the calculator then checks <203> for a multiplier stored in key register 12. If a multiplier is not stored in key register 12, the calculator then waits <209> for a trading price to be entered using keys 29. Once a trade price is entered, the TRADE key 34 is then depressed <210> which activates the processor means to determine a trading price range, then determines <211> order sizes for each price in the price range and display <212> order size by price (from table LU2) on display 14 that the user can view or scroll through <213> using up/down arrow keys 35 and 36, or increment speed keys 44, 47-49. If a multiplier is stored <203> in key register 12, the calculator then waits <204> for a trading premium to be entered using keys 29. Once a trading premium is entered, the TRADE key 34 is then depressed <205> which activates the processor means to determine a trading premium range, and then determine <206> the number of contract(s) for each premium in the premium range and display <207> the number of contract(s) by premium (from table LU2) on display 14 that the user can view or scroll through <208> using up/down arrow keys 35 and 36, or increment speed keys 44, 47-49. Control is then given back to the calling routine <214>. Please refer to tables WN-LU, LU1, LU2, LU3 for examples, All data in tables WN-LU, LU1,LU2, and LU3 are retained until the OFF (key 3), ON/C (key 1), or C/RNG (key 6) is depressed, (Please refer to examples and Equation Table 1-1 for internal calculations in regard to determining order size(s) and the number of contract(s).]

III. Options Trading Mode

The main routine <100> transfers control <301> (FIG. 1E) to the options trading subroutine <300> when keys 4,8,9,12,

23 and set keys 4, 8, 9, 12, 23, 27 are depressed. The user can then enter option variables through keys 29. These option variables are stored <303> in option key registers and displayed <304>. When the user finishes entering option variables into the different key registers, the user decides if input is complete <305>. If not, the user can continue <302> to enter option variables through keys 29. If the user decides that input is complete <305>, he/she can then depress the desired unknown/or not stored option variable key <306>, where the calculator then determines <307> that unknown variable. If the calculator cannot determine the unknown variable because necessary variables were not previously entered <312>, the user can then enter those missing variables <302>, and then once again depress <306> the desired unknown/or not stored option variable key. If the calculation is successful, the resultant variable will be stored <308> and displayed <309>; a "RUN" indicator is shown in the display when the calculation is taking place, indicating that the process is "running". At this point, the user has the choice to solve for additional unknown option variables <310>, or return the control to the calling routine <311>. Keys 4,8,9,12,23,27 and set keys 4,8,9,12,23 are used during this process, and internal variables are also assigned (see Internal Variables 1-1). Also refer to Equations Table 1-1, where any variable—for any equation—can be solved for. Stored entries can be re-displayed <304> at any time by depressing the option key directly <306>.

IV. Rate of Return Mode

The main routine <100> transfers control <401> (FIG. 1F) to the rate-of-return trading subroutine <400> when keys 10,13,14,16,20,21,25 and set keys 10,13,14,16,20,21,25 are depressed. The user can then enter margin/percentage/cash flow/rate-of-return variables through keys 29. These rate-of-return variables are stored <403> in key registers and displayed <404>. When the user finishes entering rate-of-return variables into the different key registers, the user decides if input is complete <405>. If not, the user can continue <402> to enter rate-of-return variables through keys 29. If the user decides that input is complete <405>, he/she can then depress the desired unknown/or not stored margin/percentage/cash flow/rate-of-return variable key <406>, where the calculator then determines <407> that unknown variable. If the calculator cannot determine the unknown variable because necessary variables were not previously entered <412>, the user can then enter those missing variables <402>, and then once again depress <406> the desired unknown/or not stored variable key. If the calculation is successful, the resultant variable will be stored <408> and displayed <409>; a "RUN" indicator is shown in the display when the calculation is taking place, indicating that the process is "running". At this point, the user has the choice to solve for additional unknown rate-of-return variables <410>, or return the control to the calling routine <411>. Keys 10,13,14,16,20,21,25 and set keys 10,13,14,16,20,21,25 are used during this process, and internal variables are also assigned (see Internal Variables 1-1). Also refer to Equations Table 1-1, where any variable—for any equation—can be solved for. Stored entries can be re-displayed <404> at any time by depressing the rate-of-return key directly <406>.

V. Output

The calculator will display trading order size(s) by price and number of contract(s) by premium. It will also display and solve for individual option trading variables and investment variables including stock, futures, options, mutual funds, indexes, exchange traded funds, currency, commodities, and interest rate variables, including more common investment calculations such as: gain/loss (dollars & percent), gross/net profit (dollars & percent), return rate, cash flow, yield, income, costs/fees, dividends, dividend reinvested income, reinvestment percent, average quarterly dividends, taxes, before/after taxes, before/after costs and fees, share volume, term, margin, short & long-term capital gains/losses, cost per share, basis per share, adjusted basis, total basis, buy & sell price, cash amounts, breakeven price, total cost, order sizes by price, number of contracts by premium, leverage ratios, liquidity ratios, operations ratios, profitability ratios, and display these variables resulting from the math operation(s) on the display screen simultaneously along with descriptive acronyms.

VI. Operation

The present calculator quickly and easily processes trade order size(s) by price and number of contract(s) by premium; users can view/scroll through records in a price/or premium range using up/down arrow keys or incremental speed keys. It also processes option trading and investment variables including stock, futures, options, mutual funds, indexes, exchange traded funds, currency, commodities, and interest rate variables; and display these variables resulting from the math operation(s) on the display screen simultaneously along with descriptive acronyms. The calculator is powered on by depressing the ON/C key 1. Tables are reset to default automatically, and counters are cleared.

I. Main Routine—"Basic/Core Concept Model" (as amended in FIGS. A through O; see Table 2 keys for the "Basic/Core Concept Model"). Program flow of the main routine <100> is illustrated in FIG. 30A. The calculator is powered on by depressing ON/C key 1. Internal tables are reset <101> to the default values of 0. A hard reset is only performed when the batteries are removed. At this point, any keys can be depressed <102>. The calculator determines <103> if standard calculator functions will be performed. If they are, standard keys are depressed <104>, calculated <105>, and displayed <106>. If standard calculator functions are not to be performed <103>, the mode then needs to be determined <108>. The default mode <104> is calculator mode 500. Depressing TRADE key 10 places the calculator in trade "Order Size Mode" 200. Depressing BUY key 7, SELL key 6, PROFIT key 8, or PROFIT % set key 8 places the calculator in "Rate-of-Return" or "Investment" mode 400. At any time during the operation of the calculator, any of the above keys can be depressed whereupon the calculator enters the corresponding mode 200,300,400, or 500. The main routine 100 will determine trade order size(s) by price and the number of trade contract(s) by premium <111>, display numbers including fractions that the user can select and store into key registers by using UP/and DOWN ARROW keys <110>, investment variables by calculating gain/or loss in dollars (PROFIT) or margin as a percent (PROFIT %) <112>, and standard calculator functions <104>. The calculator is powered off <114> automatically or manually with an OFF key.

II. Trade Order Size Mode—"Basic/Core Concept Model" (as amended in FIGS. A through O; see Table 2 keys for the "Basic/Core Concept Model). The main routine <100> transfers control <201> (FIG. 30B) to the trade order size subroutine <200> when TRADE key 10 <201> is depressed. This subroutine processes the cash amount stored in key register(s) CASH (key 9) or CASH2 (set key 9). If the key register does not contain a cash amount <202>, the control is immediately returned to the main routine <100>. If the key register does contain an amount in CASH (key 9) or CASH2 (set key 9) the calculator then checks <203> for a multiplier stored in key register(s) MULTIPLIER1 (set key 6) or MULTIPLIER2 (set key 7). If a multiplier is not stored in key register(s) set key(s) 6 or 7, the calculator then waits <209> for a trading price to be entered using keys 29. Once a trade price is entered, the TRADE key 10 is then depressed <210> which activates the processor means to determine <211> an order size using price and cash amount(s) stored in key registers key 9 and set key 9, and display <212> order size by price on display 14 that the user can view or scroll through <213> using UP/DOWN ARROW keys 11 and 12. [It should be mentioned that a trade price can also be entered through Selection Mode (Subroutine 300), where keypad 30 is used to enter a number followed by depression of the UP/DOWN ARROW keys, and once a number plus fraction is selected, the TRADE key 10 is depressed; see <209> or <204>.] At this point, if a multiplier is stored <203> in set key(s) 6 or 7, the calculator then waits <204> for a trading premium to be entered using keys 29. Once a trading premium is entered, the TRADE key 10 is then depressed <205> which activates the processor means to determine <206> the number of contract(s) for each premium using premium and cash amount(s) stored in key registers key 9 and set key 9, and display <207> the number of contract(s) by premium on display 14 that the user can view or scroll through <208> using UP/DOWN ARROW keys 11 and 12. Control is then given back to the calling routine <214>. All data in tables are retained until the calculator turns off or the ON/C (key 1) is depressed. [Please refer to examples and Equations Table 1-1 for internal calculations in regard to determining order size(s) and the number of contract(s).]

III. Selection Mode—"Basic/Core Concept Model" (as amended in FIGS. A through O; see Table 2 keys for the "Basic/Core Concept Model).

The main routine <100> transfers control <301> (FIG. 30C) to the selection mode subroutine <300> when UP SCROLL key 11 or DOWN SCROLL key 12 <303> is depressed. This subroutine processes a number/or price that is entered by the user on the keypad (keys 30) <302> followed by a depression <303> of the UP SCROLL key 11 or DOWN SCROLL key 12, in order to arrive <304> at a new number/or price (including fraction) that is displayed <305>, which can then be "selected"<306> and entered <307> by the user. At this point, the user can choose to continue <306> to select numbers/or prices by using the UP or DOWN SCROLL keys 11 or 12 <303>, or depress <307> a desired variable key (BUY or SELL keys, for example), in order to store <309> selection in a key register chosen by the user. If the TRADE key 10 is depressed <308>, the program goes into Order Size Mode (subroutine 200) <311>, using the selection <306> chosen by the user. Once a number/or price is selected <306> and stored <309> by the user, the program returns to the call routine <310>, where it awaits Investment Mode (subroutine 400), for example.

This mode allows a user to select and then enter a fractional number into various key registers such as BUY key 7 or SELL key 6, for example, when used in combination with FRACTION INDICATOR/SELECTOR key 13 and DECIMAL-FRACTION MODE SWITCH key 14. For example, a user may want to enter a fractional number into a BUY or SELL key register (keys 6 and 7; table 2; "Basic/Core Concept Model"), in order to calculate the PROFIT (key 8; table 2; "Basic/Core Concept Model") in dollars. This is a "Rate-of-Return Mode" or "Investment Mode" calculation, and not a calculation performed while in trade "Order Size Mode". The user would enter a whole number using the keypad (keys 30), and then depress an up/or down arrow key (keys 11 and 12; table 2; "Basic/Core Concept Model") or speed key, in order to scroll through a range of numbers each shown on the display screen, together with fractions. When the user finally increments to the number (including fraction) he/she is looking for, that number is then selected and entered into a BUY or SELL key register by depressing the corresponding BUY or SELL button, for example. At this point, the user could also decide to depress TRADE key 10, in order to enter Order Size Mode (subroutine 200), instead of entering the selected number into BUY or SELL key registers, for example.

IV. Investment Mode—"Basic/Core Concept Model" (as amended in FIGS. A through O; see Table 2 keys for the "Basic/Core Concept Model). The main routine <100> transfers control <401> (FIG. 30D) to the Rate-of-Return/or Investment subroutine <400> when keys 6, 7, 8, 9, set key(s) 8 or 9 are depressed. The user can then enter <402> investment variables through the keypad (keys 30) or numbers selected from subroutine 300 <413>. These investment variables are stored <403> in key registers and displayed <404>. When the user finishes entering investment variables into the different key registers (BUY, SELL, PROFIT, PROFIT %, for example), the user decides if input is complete <405>. If not, the user can continue to enter <402> or <413> investment variables through keypad (keys 30) or numbers selected from subroutine 300. If the user decides that input is complete <405>, he/she can then depress the desired unknown/or not stored investment variable key <406>, where the calculator then determines <407> that unknown variable (BUY, SELL, PROFIT, PROFIT %, CASH, for example). If the calculator cannot determine the unknown variable because necessary variables were not previously entered <412>, the user can then enter those missing variables <402> or <413>, and then once again depress <406> the desired unknown/or not stored variable key. If the calculation is successful, the resultant variable will be stored <408> and displayed <409>; a "RUN" indicator is shown in the display when the calculation is taking place, indicating that the process is "running". At this point, the user has the choice to solve for additional unknown investment variables <410>, or return the control to the calling routine <411>. Various investment/or rate-of-return keys are used during this process, and internal variables are assigned. Stored entries can be re-displayed <404> at any time by depressing the investment key directly <406>.

Examples of using the invention are below. Examples that demonstrated use of the trading order size mode were already shown above when discussing internal tables WN-LU,LU1, LU2,LU3. A few more examples will demonstrate the use of the calculator in options trading mode and rate of return mode, when determining individual variables. An equations table is listed for reference:

EQUATIONS TABLE 1-1

| EQU# | Internal Variable | EQUATION |
|---|---|---|
| EQU1 | FRACP = | WN + FRACIND |
| EQU2 | ORDSZ = | FRACP/(CASH$/or TBP$/or OPT$/or MARGIN$) |

EQUATIONS TABLE 1-1-continued

| EQU# | Internal Variable | EQUATION |
|---|---|---|
| EQU3 | NOOPS = | ORDSZ/MULTP |
| EQU4 | OPT14 = | (OPT1) (OPT6) (OPT12) |
| EQU6 | OPT1 = | OPT$/(OPT6) (OPT12) |
| EQU8 | OPT10 = | OPT1 + OPT9 |
| EQU10 | OPT10 = | {[(OPT6) (OPT12) (OPT1) + (OPT3)]/[(OPT6) (OPT12)]} + OPT9 |
| EQU23 | ROR12 = | ROR1/OPT8 |
| EQU24 | ROR13 = | (ROR7 − ROR8) (ROR9) |
| EQU25 | ROR14 = | (ROR6/OPT8) (ROR9) |
| EQU26 | ROR15 = | 100 − ROR9/100 |
| EQU27 | OPT7 = | OPT9 + OPT5 |
| EQU28 | OPT8 = | OPT$/OPT1 |
| EQU29 | OPT8 = | OPT6 × OPT12 |
| EQU33 | OPT13 = | (OPT12) (OPT10 − OPT9) |
| EQU34 | OPT11 = | OPT5 × OPT12 |
| EQU36 | ROR18 = | (ROR5/OPT8) (4) |
| EQU37 | ROR20 = | ROR7 × OPT8 |
| EQU38 | ROR21 = | ROR8 × OPT8 |
| EQU51 | ROR4 = | {[(ROR20 − ROR21 + ROR6 + ROR19 − ROR1/ROR21) × 100]/60} × 12 |
| EQU52 | ROR4 = | {[(ROR20 − ROR21 + ROR6/ROR21) × 100]/60} × 12 × ROR15 |
| EQU53 | ROR4 = | {[(ROR20 − ROR21 − ROR1/ROR21) × 100]/60} × 12 × ROR15 |
| EQU54 | ROR4 = | {[(ROR20 − ROR21/ROR21) × 100]/60} × 12 × ROR15 |
| EQU55 | ROR4 = | {[(ROR20 − ROR21 − ROR1/ROR21) × 100]/60} × 12 |
| EQU56 | ROR4 = | {[(ROR20 − ROR21/ROR21) × 100]/60} × 12 |
| EQU57 | ROR4 = | {[(ROR20 − ROR21 + ROR6 + ROR19/ROR21) × 100]/60} × 12 |
| EQU58 | ROR4 = | {[(ROR20 − ROR21 + ROR6 + ROR19/ROR21) × 100]/60} × 12 × ROR15 |
| EQU59 | ROR4 = | {[(ROR20 − ROR21 − ROR1 + ROR6 + ROR19/ROR21) × 100]/60} × 12 × ROR15 |
| EQU60 | ROR4 = | {[(ROR20 − ROR21 + ROR6/ROR21) × 100]/60} × 12 |
| EQU61 | ROR4 = | {[(ROR20 − ROR21 − ROR1 + ROR6/ROR21) × 100]/60} × 12 |
| EQU62 | ROR4 = | {[(ROR20 − ROR21 − ROR1 + ROR6/ROR21) × 100]/60 } × 12 × ROR15 |
| EQU5 | ROR22 = | ROR4/100 |
| EQU7 | ROR23 = | ROR17/100 |
| EQU9 | ROR24 = | ROR10/100 |
| EQU11 | ROR27 = | ROR3/100 |
| EQU63 | ROR7 = | [(ROR21) (ROR4) + (20) ROR21 − (20) ROR6 − (20) ROR19 + (20) ROR1]/(20) OPT8 |
| EQU64 | ROR7 = | [(ROR21) (ROR4) + (20) (ROR21) (ROR15) − (20) (ROR6) (ROR15)]/(20) OPT8 |
| EQU65 | ROR7 = | [(ROR21) (ROR4) + (20) (ROR21) (ROR15) + (20) (ROR1) (ROR15)]/(20) OPT8 |
| EQU66 | ROR7 = | [(ROR21) (ROR4) + (20) (ROR21) (ROR15)]/(20) OPT8 |
| EQU67 | ROR7 = | [(ROR21) (ROR4) + (20) ROR21 + (20) ROR1]/(20) OPT8 |
| EQU68 | ROR7 = | [(ROR21) (ROR4) + (20) (ROR21)]/(20) OPT8 |
| EQU69 | ROR7 = | [(ROR21) (ROR4) + (20) ROR21 − (20) ROR6 − (20) ROR19]/(20) OPT8 |
| EQU70 | ROR7 = | [(ROR21) (ROR4) + (20) (ROR21) (ROR15) − (20) (ROR6) (ROR15) − (20) (ROR19) (ROR15)]/(20) OPT8 |
| EQU71 | ROR7 = | [(ROR21) (ROR4) + (20) (ROR21) (ROR15) − (20) (ROR6) (ROR15) − (20) (ROR19) (ROR15) + (20) ROR1) (ROR15)]/(20) OPT8 |
| EQU72 | ROR7 = | [(ROR21) (ROR4) + (20) ROR21 − (20) ROR6]/(20) OPT8 |
| EQU73 | ROR7 = | [(ROR21) (ROR4) + (20) ROR21 − (20) ROR6 + (20) ROR1]/(20) OPT8 |
| EQU74 | ROR7 = | [(ROR21) (ROR4) + (20) (ROR21) (ROR15) − (20) (ROR6) (ROR15) + (20) (ROR1) (ROR15)]/(20) OPT8 |
| EQU75 | ROR11 = | [(ROR7 − ROR8) (OPT8) − ROR1] × [ROR15] |
| EQU76 | ROR11 = | [(ROR7 − ROR8) (OPT8)] × [ROR15] |
| EQU77 | ROR11 = | [(ROR7 − ROR8) (OPT8) − ROR1] |
| EQU78 | ROR11 = | [(ROR7 − ROR8) (OPT8)] |
| EQU79 | ROR3 = | [(ROR5/OPT8) (4)] × (ROR15)/ROR7 |
| EQU80 | ROR3 = | [(ROR5/OPT8) (4)]/ROR7 |
| EQU81 | ROR6 = | (ROR5/3) (ROR2) (ROR15) |
| EQU82 | ROR6 = | (ROR5/3) (ROR2) |
| EQU83 | ROR19 = | (ROR6 × ROR23) (ROR15) |
| EQU84 | ROR19 = | (ROR6 × ROR23) |
| EQU#-# | ROR10 = | IRR % equations still being developed, and will be added when completed. |

RATE OF RETURN MODE CALCULATIONS (TABLE 3-1)

Program Flow

| | ROR15 | ROR1 | ROR19 | ROR6 |
|---|---|---|---|---|
| EQU51, 63 | =0 | >0 | >0 | >0 |
| EQU52, 64 | >0 | =0 | >0 | >0 |
| EQU53, 65 | >0 | >0 | =0 | =0 |
| EQU54, 66 | >0 | =0 | =0 | =0 |
| EQU55, 67 | =0 | >0 | =0 | =0 |
| EQU56, 68 | =0 | =0 | =0 | =0 |
| EQU57, 69 | =0 | =0 | >0 | >0 |
| EQU58, 70 | >0 | >0 | >0 | >0 |
| EQU59, 71 | >0 | =0 | >0 | >0 |
| EQU60, 72 | =0 | =0 | =0 | >0 |
| EQU61, 73 | =0 | =0 | =0 | >0 |
| EQU62, 74 | >0 | =0 | =0 | >0 |
| EQU75 | >0 | >0 | n/a | n/a |
| EQU76 | >0 | =0 | n/a | n/a |

RATE OF RETURN MODE CALCULATIONS (TABLE 3-1)

| | Program Flow | | | |
|---|---|---|---|---|
| | ROR15 | ROR1 | ROR19 | ROR6 |
| EQU77 | =0 | >0 | n/a | n/a |
| EQU78 | =0 | =0 | n/a | n/a |
| EQU79 | >0 | n/a | n/a | n/a |
| EQU80 | =0 | n/a | n/a | n/a |
| EQU81 | >0 | n/a | n/a | n/a |
| EQU82 | =0 | n/a | n/a | n/a |
| EQU83 | >0 | n/a | n/a | n/a |
| EQU84 | =0 | n/a | n/a | n/a |

Options Trade Mode

EXAMPLES

Example 1

If I want to buy 35 options at $10.00 premium, how much option money do I need? (multiplier of 100 assumed to be stored in key 12).

| EQU4 | OPT14 = | (OPT1) (OPT6) (OPT12) |
|---|---|---|
| EQU4 | OPT14 = | ($10) (35) (100) = $35,000 |

In this example, all known data would be entered by the user, stored in the associated key register, and assigned an internal variable. The user would then depress the option money key 4. At this point, the calculator would display "RUN" in display 14 (section 18), then calculate EQU4 and store the resultant variable assigned OPT14 to key register 13, and also display this variable in display 14 (section 16). The option variable mode would be displayed in display 14 (section 20) along with the specific key indicator (section 21). Please refer to Options Trading Mode (Section III) (FIG. 1E) for more details on program flow. All other option variable mode examples below will follow this same logic.

Example 2

If I have $30,000 in total option money, and want to buy 20 options, what does the premium need to be? (multiplier of 100 assumed to be stored in key 12).

| EQU6 | OPT1 = | OPT$/(OPT6) (OPT12) |
|---|---|---|
| EQU6 | OPT1 = | $30,000/(20) (100) = $15 premium per share. |

Example 3

What exercise price/or cap price do I need to reach to have "even" option money for puts and calls. My original premium was $5.00 and strike price $50.00.

| EQU8 | OPT10 = | OPT1 + OPT9 |
|---|---|---|
| EQU8 | OPT10 = | $5.00 + $50.00 = $55.00 |

Example 4

If I want to be "in-the-money" by $15,000, what exercise price/or cap price do I need to reach? I have 12 options at a $7.00 premium and a $40.00 strike price (multiplier of 100 assumed to be stored in key 12).

$$OPT10=\{[(OPT6)(OPT12)(OPT1)+(OPT3)]/[(OPT6)(OPT12)]\}+OPT9 \quad \text{EQU10}$$

$$OPT10=\{[(12)(100)(\$7.00)+(\$15,000)]/[(12)(100)]\}+\$40=\$59.50 \quad \text{EQU10}$$

Example 5

What will my settlement value be for an automatically exercised option with a cap interval of 23? (multiplier of 100 assumed to be stored in key 12).

| EQU34 | OPT11 = | OPT5 × OPT12 |
|---|---|---|
| EQU34 | OPT11 = | 23 × 100 = $2300 |

Example 6

What will my settlement value be for an option that is not automatically exercised? The exercise settlement value today is $55.30 and my strike price was $41.75.

| EQU33 | OPT13 = | (OPT12) (OPT10 − OPT9) |
|---|---|---|
| EQU33 | OPT13 = | (100) ($55.30 − $41.75) = $1355 |

Rate of Return Mode

EXAMPLES

Example 1

What is my FMRR rate of return (before taxes) if I sell now? My dividends are reinvested at 5%. (purchase price=$30.00/share, current price=$36.00/share, number of shares=200, avg. quarterly dividend=$100, term/months owned=60, total tax %=28%, total fees=$400).

In this example, all known data would be entered by the user, stored in the associated key register, and assigned an internal variable. The user would then depress the ROR % key 13. At this point, the calculator would display "RUN" in display 14 (section 18), then calculate the appropriate equation selected by program flow (FIG. 1F). In this example, at the time of depression of key 13, if ROR9=0, ROR1>0, ROR19>0, and ROR6>0, then equation EQU11 would be calculated by program flow (FIG. 1F) and resultant variable assigned ROR4 to key register 13. This variable would be displayed in display 14 (sections 16,17,20,21). Please refer to Rate of Return Mode Section IV for more details on program flow and key depression sequence. Other examples for FMRR rate of return follow this same logic, depending on whether ROR9, ROR1, ROR19, and ROR6 are > or = to zero (refer to FIG. 1F and EQU51-62).

| EQU51 | ROR4 = | $\{[(ROR20 - ROR21 + ROR6 + ROR19 - ROR1/ROR21) \times 100]/60\} \times 12$ |

-continued

| EQU51 | ROR4 = | {[($7200 − $6000 + $2000 + $100 − $400/$6000) × 100]/60} × 12 = 9.66% annualized rate of return |
|---|---|---|
| EQU15 | ROR6 = | (ROR5/3) (ROR2) = (100/3) (60) = $2000 |
| EQU37 | ROR20 = | ROR7 × OPT8 = $36 × 200 = $7200 |
| EQU38 | ROR21 = | ROR8 × OPT8 = $30 × 200 = $6000 |
| EQU35 | ROR19 = | ROR6 × ROR23 = $2000 × .05 = $100 |
| EQU7 | ROR23 = | ROR17/100 = 5%/100 = .05 |

Example 2

What is my FMRR rate of return, without fees and after taxes, if I sell now? My dividends are not reinvested. (purchase price=$30.00/share, current price=$36.00/share, number of shares=200, avg. quarterly dividend=$100, term/months owned=60, total tax %=28%, total fees=$400).

Similar to Example 7 above, all known data would be entered by the user, stored in the associated key register, and assigned an internal variable. The user would then depress the ROR % key 13. At this point, the calculator would display "RUN" in display 14 (section 18), then calculate the appropriate equation selected by program flow (FIG. 1F). In this example, at the time of depression of key 13, if $ROR9>0$, $ROR1=0$, $ROR19=0$, and $ROR6>0$, then equation EQU12 would be calculated by program flow (FIG. 1F) and resultant variable assigned ROR4 to key register 13. This variable would be displayed in display 14 (sections 16,17,20,21). Please refer to Rate of Return Mode Section IV for more details on program flow and key depression sequence. Other examples for FMRR rate of return follow this same logic, depending on whether ROR9, ROR1, ROR19, and ROR6 are > or = to zero (refer to FIG. 1F and EQU51-62).

| EQU52 | ROR4 = | {[(ROR20 − ROR21 + ROR6/ROR21) × 100]/60} × 12 × ROR15 |
|---|---|---|
| EQU52 | ROR4 = | {[($7200 − $6000 + $2000/$6000) × 100]/60} × 12 × .72 = 7.68% |
| EQU26 | ROR15 = | (100 − ROR9)/100 = (100 − 28)/100 = .72 |
| EQU15 | ROR6 = | (ROR5/3) (ROR2) = (100/3) (60) = $2000 |
| EQU37 | ROR20 = | ROR7 × OPT8 = $36 × 200 = $7200 |
| EQU38 | ROR21 = | ROR8 × OPT8 = $30 × 200 = $6000 |

Example 3

What selling price provides my desired FMRR rate of return of 15%?

My dividends are reinvested at 5%. (purchase price=$30.00/share, current price=$36.00/share, number of shares=200, avg. quarterly dividend=$100, term/months owned=60, total tax %=28%, total fees=$400).

In this example, all known data would be entered by the user, stored in the associated key register, and assigned an internal variable. The user would then depress the C/PRICE key 10. At this point, the calculator would display "RUN" in display 14 (section 18), then calculate the appropriate equation selected by program flow (FIG. 1F). In this example, at the time of depression of key 10, if $ROR9=0$, $ROR1>0$, $ROR19>0$, and $ROR6>0$, then equation EQU63 would be calculated by program flow (FIG. 1F) and resultant variable assigned ROR7 to key register 10. This variable would be displayed in display 14 (sections 16,17,20,21). Please refer to Rate of Return Mode Section IV for more details on program flow and key depression sequence. Other examples for FMRR rate of return follow this same logic, depending on whether ROR9, ROR1, ROR19, and ROR6 are > or = to zero (refer to FIG. 1F and EQU63-74).

| EQU63 | ROR7 = | [(ROR21) (ROR4) + (20) ROR21 − (20) ROR6 − (20) ROR19 + (20) ROR1]/(20) OPT8 |
|---|---|---|
| EQU63 | ROR7 = | [($6000) (15) + (20) ($6000) − (20) ($2000) − (20) ($100) + (20) ($400)]/(20) (200) = $44.00 per share. |
| EQU38 | ROR21 = | ROR8 × OPT8 = $30 × 200 = $6000 |
| EQU15 | ROR6 = | (ROR5/3) (ROR2) = (100/3) (60) = $2000 |
| EQU35 | ROR19 = | ROR6 × ROR23 = $2000 × .05 = $100 |
| EQU7 | ROR23 = | ROR17/100 = 5%/100 = .05 |

Example 4

What is my total gain/or loss on sale, after taxes and with fees?

My dividends are reinvested at 5%. (purchase price=$30.00/share, current price=$36.00/share, number of shares=200, avg. quarterly dividend=$100, term/months owned=60, total tax %=28%, total fees=$400).

In this example, all known data would be entered by the user, stored in the associated key register, and assigned an internal variable. The user would then depress the G/L set key 16. At this point, the calculator would display "RUN" in display 14 (section 18), then calculate the appropriate equation selected by program flow (FIG. 1F). In this example, at the time of depression of set key 16, if $ROR9>0$, $ROR1>0$, then equation EQU75 would be calculated by program flow (FIG. 1F) and resultant variable assigned ROR11 to key register set 16. This variable would be displayed in display 14 (sections 16,17,20,21). Please refer to Rate of Return Mode Section IV for more details on program flow and key depression sequence. Other examples for total gain/loss follow this same logic, depending on whether ROR9 and ROR1 are > or = to zero (refer to FIG. 1F and EQU75-78).

| EQU75 | ROR11 = | [(ROR7 − ROR8) (OPT8) − ROR1] × [ROR15] |
|---|---|---|
| EQU75 | ROR11 = | [($36 − $30) (200) − $400] × (.72) = $576.00 |
| EQU26 | ROR15 = | (100 − ROR9)/100 = (100 − 28)/100 = .72 |

Example 5

What is my current yield on dividends after taxes?

My dividends are reinvested at 5%. (purchase price=$30.00/share, current price=$36.00/share, number of shares=200, avg. quarterly dividend=$100, term/months owned=60, total tax %=28%, total fees=$400).

In this example, all known data would be entered by the user, stored in the associated key register, and assigned an internal variable. The user would then depress the YLD % key 16. At this point, the calculator would display "RUN" in display 14 (section 18), then calculate the appropriate equation selected by program flow (FIG. 1F). In this example, at the time of depression of key 16, if $ROR9>0$, then equation EQU79 would be calculated by program flow (FIG. 1F) and resultant variable assigned ROR3 to key register 16. This variable would be displayed in display 14 (sections 16,17,20, 21). Please refer to Rate of Return Mode Section IV for more details on program flow and key depression sequence. Other examples for yield % follow this same logic, depending on whether or not ROR9 is > or = to zero (refer to FIG. 1F and EQU79-80).

| EQU79 | ROR3 = | [(ROR5/OPT8) (4)] × (ROR15)/ROR7 |
|---|---|---|
| EQU79 | ROR3 = | [(100/200) (4)] × (.72)/$36 = 4% |
| EQU26 | ROR15 = | (100 − ROR9)/100 = (100 − 28)/100 = .72 |

Example 6

What are my total dividends received after taxes?
My dividends are reinvested at 5%. (purchase price=$30.00/share, current price=$36.00/share, number of shares=200, avg. quarterly dividend=$100, term/months owned=60, total tax %=28%, total fees=$400).

In this example, all known data would be entered by the user, stored in the associated key register, and assigned an internal variable. The user would then depress the DVD$ key 20. At this point, the calculator would display "RUN" in display 14 (section 18), then calculate the appropriate equation selected by program flow (FIG. 1F). In this example, at the time of depression of key 20, if ROR9>0, then equation EQU81 would be calculated by program flow (FIG. 1F) and resultant variable assigned ROR6 to key register 20. This variable would be displayed in display 14 (sections 16,17,20, 21). Please refer, to Rate of Return Mode Section IV for more details on program flow and key depression sequence. Other examples for total dividends follow this same logic, depending on whether or not ROR9 is > or = to zero (refer to FIG. 1F and EQU81-82).

| EQU81 | ROR6 = | (ROR5/3) (ROR2) (ROR15) |
|---|---|---|
| EQU81 | ROR6 = | ($100/3) (60) (.72) = $1440.00 |
| EQU26 | ROR15 = | (100 − ROR9)/100 = (100 − 28)/100 = .72 |

Example 7

What is my total dividend reinvested income after taxes?
My dividends are reinvested at 5%. (purchase price=$30.00/share, current price=$36.00/share, number of shares=200, avg. quarterly dividend=$100, term/months owned=60, total tax %=28%, total fees=$400).

In this example, all known data would be entered by the user, stored in the associated key register, and assigned an internal variable. The user would then depress the DVD INC key 14. At this point, the calculator would display "RUN" in display 14 (section 18), then calculate the appropriate equation selected by program flow (FIG. 1F). In this example, at the time of depression of key 14, if ROR9>0, then equation EQU83 would be calculated by program flow (FIG. 1F) and resultant variable assigned ROR19 to key register 14. This variable would be displayed in display 14 (sections 16,17,20, 21). Please refer to Rate of Return Mode Section IV for more details on program flow and key depression sequence. Other examples for total dividend reinvested income follow this same logic, depending on whether or not ROR9 is > or = to zero (refer to FIG. 1F and EQU83-84).

| EQU83 | ROR19 = | (ROR6 × ROR23) (ROR15) |
|---|---|---|
| EQU83 | ROR19 = | ($2000 × .05) (.72) = $72.00 |
| EQU82 | ROR6 = | (ROR5/3) (ROR2) = (100/3) (60) = $2000 |

| EQU7 | ROR23 = | ROR17/100 = 5%/100 = .05 |
|---|---|---|
| EQU26 | ROR15 = | (100 − ROR9)/100 = (100 − 28)/100 = .72 |

Example 8

What is my internal rate of return after taxes if I sell now?
My dividends are reinvested at 5%. (purchase price=$30.00/share, current price=$36.00/share, number of shares=200, avg. quarterly dividend=$100, term/months owned=60, total tax %=28%, total fees=$400).

In this example, all known data would be entered by the user, stored in the associated key register, and assigned an internal variable. The user would then depress the IRR % set key 13. At this point, the calculator would display "RUN" in display 14 (section 18), then calculate the appropriate equation selected by program flow. (FIG. 1F) The resultant variable assigned ROR10 would be stored in key register set 13. This variable would be displayed in display 14 (sections 16,17,20,21). Please refer to Rate of Return Mode Section IV for more details on program flow and key depression sequence. Other examples for internal rate of return follow this same logic (refer to FIG. 1F and EQU#-EQU#).
Note: *IRR % equations still being developed, and will be added on completion.

INVESTMENT MODE—EXAMPLES ["BASIC/CORE CONCEPT MODEL" (as amended in FIGS. A through O; see Table 2 keys for the "Basic/Core Concept Model).]

Example 1

If I sell now at $12.63, what will my profit be?
BUY (key 7) previously entered & stored amount=$10.30
CASH (key 9) previously entered & stored amount=$10,000.00

[$10,000.00 divided by $12.63]×[$12.63−$10.30]=$1,844.82

This example is a gain/or loss calculation in actual dollars, not expressed as a percent. The BUY price and CASH amount being traded/or invested would be entered by the user, stored in the associated key register(s), and assigned an internal variable. The trader or investor would then depress the PROFIT key 8. At this point, the calculator would display "RUN", then determine and store the resultant variable in PROFIT key register 8, and also display this variable. PROFIT key 8 internal calculations are determined as a gain/or loss calculation in dollars; profit determined as a percent is performed through PROFIT % set key 8. Profit amounts stored in PROFIT key 8 or PROFIT % set key 8 can be positive or negative numbers (−33.50%, −$180.23, for example). It should also be noted that stored variables can be entered through the keypad (keys 30) or selected and entered into key registers via Selection Mode subroutine 300. In this example, CASH2 set key 9 could have been used instead of CASH key 9; CASH2 is a second pre-set for the amount being traded or invested. BUY, SELL, PROFIT, PROFIT %, CASH, and CASH2 keys stores trading and investment data entered by the user, and the calculator then solves for the unknown/or not stored variable. Modes of operation and specific key indicators would also be displayed (please refer to FIGS. A through O; "Basic/Core Concept Model"). Please refer to Investment Mode subroutine 400 for more details on program flow. Other examples for Investment Mode follow this same logic, and include solving for individual variables such as:

If I sell now at $12.63, what will my profit percent be? [I bought for $20.00 and have $15,000.00 in cash].

If I want to make a profit of $3,000.00, what price/or premium would I need to sell at? [I bought for $15.00 and have $5,000.00 in cash].

If I want to make a profit of $3,000.00 and want to sell at $32.50, what price/or premium do I need to buy at? [I have $5,000.00 in cash].

If I buy for $5.00 and sell for $10.00, and want to make a profit of $25,000.00, how much cash do I need to trade or invest?

Again, in these examples, either pre-set CASH or CASH2 could be selected for the cash amount, with the corresponding key indicator shown in the display (CASH, CASH2, for example). MULTIPLIER1 (set key 6) and MULTIPLIER2 (set key 7) are both used as pre-sets for an options or trade contract multiplier when in Order Size Mode (please refer to subroutine 200). If an amount is stored by the trader or investor in MULTIPLIER1 or MULTIPLIER2 (MP1 or MP2 shown as a key indicator in display), then subroutine 200 determines the number of trade contracts instead of an order size.

VII. Conclusion

The manner and process of making the invention will follow traditional portable handheld calculator manufacturing processes including overall circuit board design, layout, prototype, and construction. The best mode contemplated in order to carry out the invention will be to obtain patents, and then license these patents to leading specialty calculator manufacturers who are experts in bringing handheld calculators to market. The above description is that of a preferred embodiment of the invention. Various changes and alterations can be made without departing from the spirit and broader aspects of the invention as set forth in the appended claims, which are to be interpreted in accordance with the principles of patent law, including the doctrine of equivalents. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit or scope of this invention, as defined by the following claims. Thus, it is intended that the following claims be interpreted to embrace all such further modifications, changes, rearrangements, substitutions, alternatives, design choices, and embodiments.

We claim the invention of a hand-held electronic calculator for traders of all levels . . . trading securities of all types, the embodiments in which an exclusive property or privilege is claimed are defined as follows:

1. An electronic hand held calculator comprising:
   an input means,
   a processor, said processor configured to execute equations EQU1 through EQU11; EQU15; EQU23 through EQU 29; EQU33 through 38; EQU51 through EQU84, and
   a display to provide answers to trading and investment calculations.

* * * * *